US011885274B2

(12) United States Patent
Akiyama et al.

(10) Patent No.: US 11,885,274 B2
(45) Date of Patent: Jan. 30, 2024

(54) CONTROLLER FOR INTERNAL COMBUSTION ENGINE, CONTROL METHOD FOR INTERNAL COMBUSTION ENGINE, AND MEMORY MEDIUM

(71) Applicant: TOYOTA JIDOSHA KABUSHIKI KAISHA, Aichi-ken (JP)

(72) Inventors: Shoichi Akiyama, Toyota (JP); Noboru Takagi, Toyota (JP); Rihito Kaneko, Miyoshi (JP); Hirokazu Tanaka, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/165,329

(22) Filed: Feb. 7, 2023

(65) Prior Publication Data

US 2023/0250773 A1 Aug. 10, 2023

(30) Foreign Application Priority Data

Feb. 10, 2022 (JP) ................................ 2022-019430

(51) Int. Cl.

*F02D 41/06* (2006.01)
*F02D 41/38* (2006.01)
*F02D 41/32* (2006.01)

(52) U.S. Cl.

CPC ........... *F02D 41/068* (2013.01); *F02D 41/32* (2013.01); *F02D 41/38* (2013.01); *F02D 2041/389* (2013.01); *F02D 2200/021* (2013.01)

(58) Field of Classification Search

CPC ........ F02D 41/068; F02D 41/32; F02D 41/38; F02D 2041/389; F02D 2200/021

See application file for complete search history.

(56) References Cited

U.S. PATENT DOCUMENTS

| | | | | |
|---|---|---|---|---|
| 10,655,555 B2 * | 5/2020 | Nagakura | ........... | F02D 41/3094 |
| 2015/0322879 A1 * | 11/2015 | Zeng | .................. | F02D 41/3094 701/103 |
| 2018/0230928 A1 * | 8/2018 | Kitazume | ............. | F02D 41/047 |
| 2019/0360447 A1 * | 11/2019 | Miwa | .................... | F02D 41/047 |

FOREIGN PATENT DOCUMENTS

| | | | | |
|---|---|---|---|---|
| JP | 2021105338 A | 7/2021 | | |
| WO | WO-03012265 A1 * | 2/2003 | ........... | F01N 3/2006 |
| WO | WO-2019069443 A1 * | 4/2019 | | |

* cited by examiner

*Primary Examiner* — Joseph J Dallo
(74) *Attorney, Agent, or Firm* — HAUPTMAN HAM, LLP

(57) ABSTRACT

Control circuitry executes an increase correction control for fuel when an internal combustion engine is started. A determination process determines whether warm-up in a cylinder is completed. A direct injection mode injects fuel only from a direct injection valve when it is determined that the warm-up in the cylinder is completed. A reduction process sets an increase correction amount of fuel obtained through the increase correction control when executing the direct injection mode to be less than an increase correction amount obtained prior to the execution of the direct injection mode.

18 Claims, 9 Drawing Sheets

CONTROLLER FOR INTERNAL COMBUSTION ENGINE, CONTROL METHOD FOR INTERNAL COMBUSTION ENGINE, AND MEMORY MEDIUM

RELATED APPLICATIONS

The present application claims priority of Japanese Patent Application No. 2022-019430 filed Feb. 10, 2022, the disclosure of which is hereby incorporated by reference herein in its entirety.

BACKGROUND

1. Field

The present disclosure relates to a controller for an internal combustion engine, a control method for an internal combustion engine, and a memory medium.

2. Description of Related Art

A typical internal combustion engine includes a port injection valve that injects fuel into an intake port and a direct injection valve that directly injects fuel into a cylinder. In a case in which the temperature of coolant in the internal combustion engine is relatively low at engine start, the intake port has a relatively low temperature.

When the intake port has a relatively low temperature, the above controller for the internal combustion engine executes an increase correction control. The increase correction control is performed to increase the amount of fuel injected from the port injection valve so as to compensate for the amount of fuel that collects in the intake port.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

When the increase correction control is executed, the injected fuel is corrected so as to be increased. This may worsen fuel economy.

An aspect of the present disclosure provides a controller for an internal combustion engine. The internal combustion engine includes a port injection valve that injects fuel into an intake port and a direct injection valve that directly injects fuel into a cylinder. The controller includes control circuitry configured to execute an increase correction control for fuel when the internal combustion engine is started. The control circuitry is configured to execute a determination process that determines whether warm-up in the cylinder is completed, a process that executes a direct injection mode that injects fuel only from the direct injection valve when it is determined that the warm-up in the cylinder is completed, and a reduction process that sets an increase correction amount of fuel obtained through the increase correction control when executing the direct injection mode to be less than an increase correction amount obtained prior to the execution of the direct injection mode.

At engine start, the temperature of the intake port is similar to the coolant temperature of the internal combustion engine. At engine start, the temperature in the cylinder rises at a speed higher than that of the temperature of the intake port. When the warm-up in the cylinder is completed, the fuel injected from the direct injection valve is quickly vaporized without forming a liquid film even if the fuel collects on the piston or the cylinder inner wall. This limits the generation of particulate matter. This is because, although particulate matter may be generated when droplets are generated from the fuel in the state of a liquid film, the above configuration limits situations in which fuel forms a liquid film. Further, when fuel is injected only from the direct injection valve, the injected fuel is unlikely to collect on the intake port. Accordingly, in the configuration, as compared with when fuel is injected from the port injection valve, the increase correction amount of fuel obtained through the increase correction control is reduced.

Thus, in the above configuration, the control circuitry determines whether the warm-up in the cylinder is completed. When determining that the warm-up in the cylinder is completed, the control circuitry executes the direct injection mode to inject fuel only from the direct injection valve. When executing the direct injection mode, the control circuitry executes the reduction process to set the increase correction amount of fuel obtained through the increase correction control to be less than the increase correction amount obtained prior to the execution of the direct injection mode. Thus, the increase correction amount of fuel decreases quickly as compared with when the increase correction control is performed based on the coolant temperature. This improves the fuel economy at engine start.

In the configuration, the process that decreases the increase correction amount includes a process that sets the increase correction amount to 0.

In the controller, the control circuitry further executes a process that obtains a temperature of a piston of the internal combustion engine. The determination process may include a process that determines that the warm-up in the cylinder is completed when the obtained temperature of the piston is greater than or equal to a given determination value.

In the controller, the control circuitry further executes a process that obtains a wall surface temperature of a cylinder bore of the internal combustion engine. The determination process may include a process that determines that the warm-up in the cylinder is completed when the obtained wall surface temperature of the cylinder bore is greater than or equal to a given determination value.

In the controller, the control circuitry further executes a process that increases an idle rotation speed when the internal combustion engine is started. The control circuitry may execute a speed decreasing process that sets a decreasing speed of an increase amount of the idle rotation speed when executing the direct injection mode to be higher than a decreasing speed obtained prior to the execution of the direct injection mode.

In this configuration, when the direct injection mode is executed, the engine rotation speed is quickly reduced by executing the speed decreasing process. A quick decrease in the engine rotation speed decreases the number of fuel injections per unit time. This also improves the fuel economy at engine start.

In the controller, the speed decreasing process may be a process that suspends an increase in the idle rotation speed. This allows the advantage resulting from the speed decreasing process to be maximized.

Another aspect of the present disclosure may provide a control method for an internal combustion engine that executes various processes according to any one of the above controllers.

A further aspect of the present disclosure may provide a non-transitory computer-readable memory medium that stores a program that causes a processor to execute various processes according to any one of the above controllers.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 100 for an internal combustion engine 1 according to an embodiment will now be described with reference to FIGS. 1 to 13.

Configuration of Internal Combustion Engine

Figure 1:
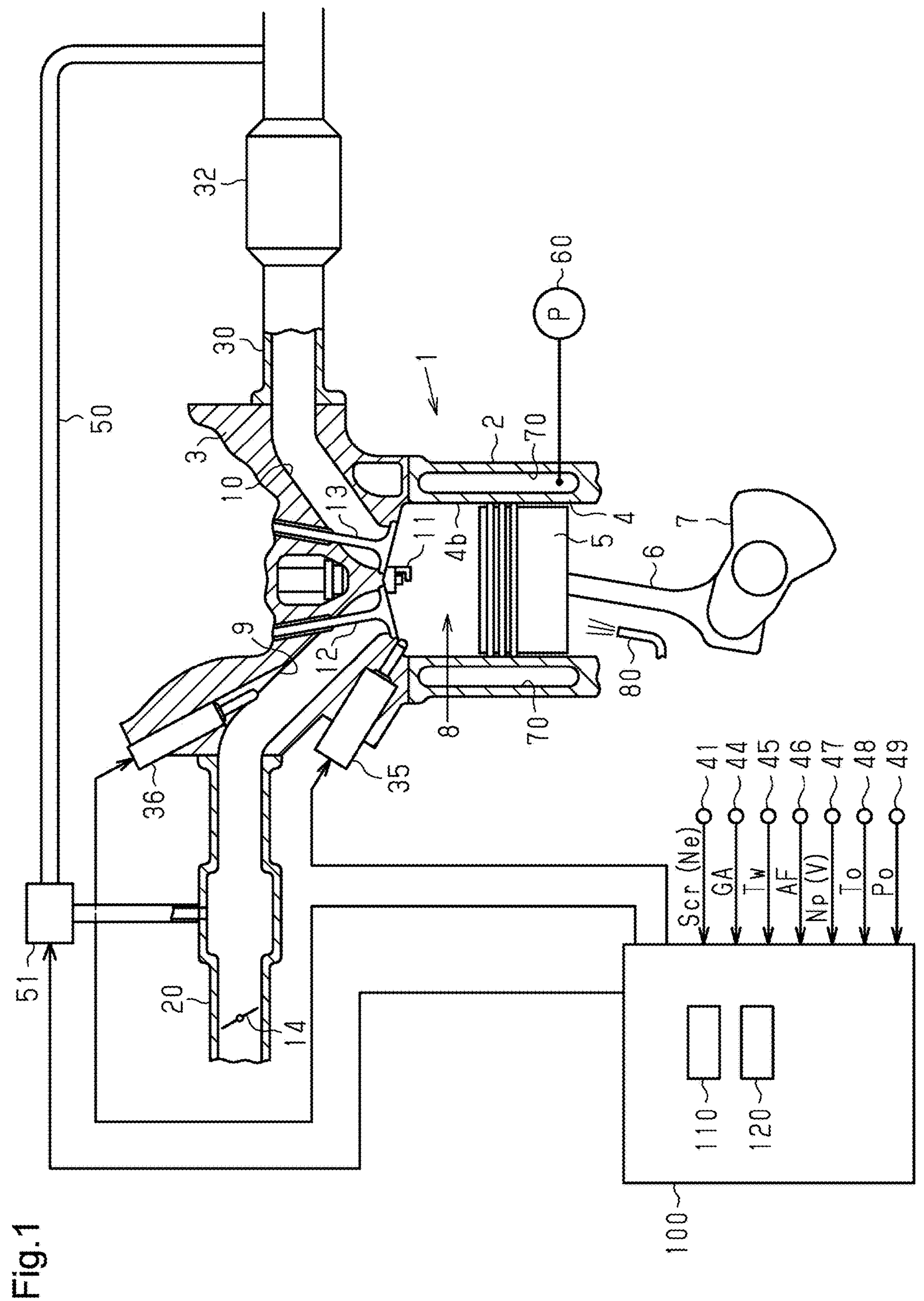
FIG. 1 is a schematic diagram of an internal combustion engine according to an embodiment.

Referring to FIG. 1, one or more cylinders 4 are disposed in a cylinder block 2 of the internal combustion engine 1. Each cylinder 4 includes a cylinder inner wall 4*b*, defining a cylinder bore. A piston 5 is disposed in the cylinder 4 and coupled to a crankshaft 7 by a connecting rod 6.

The cylinder block 2 includes a water jacket 70 through which coolant supplied from a water pump 60 flows.

A cylinder head 3 is coupled to an upper portion of the cylinder block 2. In each cylinder 4, a combustion chamber 8 is defined between the top surface of the piston 5 and the cylinder head 3. The cylinder 4 of the internal combustion engine 1 includes a direct injection valve 35 that directly injects fuel into the cylinders 4 and an ignition plug 11 that performs spark-ignition for the air-fuel mixture in the combustion chamber 8. The direct injection valves 35 and the ignition plugs 11 are disposed in the cylinder head 3.

The cylinder head 3 further includes an intake port 9 that draws intake air into the combustion chamber 8 and an exhaust port 10 that discharges exhaust gas from the combustion chamber 8.

The intake port 9 is connected to an intake passage 20 provided with a throttle valve 14 that regulates an intake air amount. The intake port 9 includes an intake valve 12 that opens and closes the intake port 9. Each cylinder 4 of the internal combustion engine 1 includes a port injection valve 36 that injects fuel into the intake port 9. The port injection valves 36 are disposed in the cylinder head 3.

The exhaust port 10 includes an exhaust valve 13 that opens and closes the exhaust port 10. The exhaust port 10 is connected to an exhaust passage 30. The exhaust passage 30 includes a catalyst 32 that purifies exhaust gas. The catalyst 32 purifies exhaust gas when the air-fuel ratio of the air-fuel mixture is controlled to a target air-fuel ratio.

The internal combustion engine 1 includes an oil jet 80 that injects lubricating oil toward the piston 5.

The fuel of the internal combustion engine 1 may be alcohol fuel (i.e., fuel in which the percentage of alcohol fuel is 100%) or may be gasoline fuel (i.e., fuel in which the percentage of alcohol fuel is 0%). Alternatively, the fuel of the internal combustion engine 1 may be mixed fuel in which alcohol fuel and gasoline fuel are mixed.

The internal combustion engine 1 includes an exhaust gas recirculation (EGR) passage 50 that recirculates exhaust gas to the intake passage 20 as EGR gas. The EGR passage 50 connects a portion of the intake passage 20 downstream of the throttle valve 14 to the exhaust passage 30. The EGR passage 50 includes an EGR valve 51. The flow rate of the EGR gas flowing from the exhaust passage 30 into the intake passage 20 is adjusted by controlling the opening degree of the EGR valve 51.

Controller

The controller 100 includes control circuitry. The control circuitry includes a central processing unit (hereinafter referred to as a CPU) 110 and a memory 120 that stores programs and data used for control. The CPU 110 executes the programs stored in the memory 120 so that the control circuitry executes various types of engine control and processes.

Various sensors are connected to the controller 100. Examples of the sensors connected to the controller 100 include a crank angle sensor 41, an air flow meter 44, a water temperature sensor 45, an air-fuel ratio sensor 46, a pump speed sensor 47, an oil temperature sensor 48, and a hydraulic pressure sensor 49. The crank angle sensor 41 detects the rotation angle of the crankshaft 7. The air flow meter 44 detects an intake air amount GA. The water temperature sensor 45 detects a coolant temperature Tw, which is the temperature of the coolant obtained after heat exchange in the internal combustion engine 1. The air-fuel ratio sensor 46 is disposed in the exhaust passage 30 upstream of the catalyst 32 to detect an air-fuel ratio AF. The pump speed sensor 47 detects a pump rotation speed Np, which is the rotation speed of the water pump 60. The oil temperature sensor 48 detects an oil temperature To, which is the temperature of the lubricating oil supplied to the oil jet 80. The hydraulic pressure sensor 49 detects a hydraulic pressure Po of the lubricating oil supplied to the oil jet 80.

The controller 100 calculates an engine rotation speed Ne based on an output signal Scr of the crank angle sensor 41. Further, the controller 100 calculates an engine load factor KL based on the engine rotation speed Ne and the intake air amount GA. The engine load factor KL is the ratio of the current cylinder inflow air amount to the cylinder inflow air amount obtained during steady operation of the internal combustion engine 1, with the throttle valve 14 fully open at the current engine rotation speed Ne. The cylinder inflow air amount is the amount of air that flows into each cylinder 4 in an intake stroke. The controller 100 calculates a flow rate V of the coolant flowing through the water jacket 70 based on the pump rotation speed Np.

Injection Distribution of Fuel

As one of various controls for the internal combustion engine 1, the controller 100 executes a process that switches between three types of fuel injection modes according to the engine operating state. One of the fuel injection modes switched to in the present embodiment is a direct injection mode, in which fuel is injected only from the direct injection valves 35. Another one of the fuel injection modes switched to in the present embodiment is a port injection mode, in which fuel is injected only from the port injection valves 36. A further one of the fuel injection modes switched to in the present embodiment is a dual injection mode, in which fuel is injected from the direct injection valve 35 and the port injection valve 36.

The fuel injection mode is switched by varying a port injection ratio Rpf set based on the engine operating state. The port injection ratio Rpf indicates the ratio of the amount of fuel injected from the port injection valve 36 to a fuel injection amount Q.

The port injection ratio Rpf is varied within a range of $0 \leq Rpf \leq 1$ based on the engine operating state such as the engine load factor KL and the engine rotation speed Ne. The value obtained by multiplying the fuel injection amount Q by the port injection ratio Rpf is set as a port injection amount Qpf, which is the amount of fuel injected from the port injection valve 36. The value obtained by subtracting the port injection ratio Rpf from 1 is calculated as a direct injection ratio Rd ($Rd=1-Rpf$). The direct injection ratio Rd indicates the ratio of the amount of fuel injected from the direct injection valve 35 to the fuel injection amount Q. The value obtained by multiplying the fuel injection amount Q by the direct injection ratio Rd is set as a direct injection amount Qd, which is the amount of fuel injected from the direct injection valve 35.

EGR Control

As one of the various controls for the internal combustion engine 1, the controller 100 executes an EGR control that regulates an EGR amount. The EGR amount is a recirculation amount of EGR gas (external EGR gas), which is exhaust gas recirculated to the intake passage 20. In the EGR control, the controller 100 calculates a target EGR ratio EGp based on the engine operating state such as the engine rotation speed Ne and the engine load factor KL. The target EGR ratio EGp is a command value used to regulate the amount of EGR flowing into the intake passage 20 through the EGR passage 50. The EGR ratio is the ratio of the EGR amount to the total amount of in-cylinder filling gas. Based on the target EGR rate EGp, the intake air amount GA, and the like, the controller 100 calculates a target opening degree EAt of the EGR valve 51, at which the target EGR ratio EGp is achieved. The controller 100 regulates the opening degree of the EGR valve 51 so that the opening degree of the EGR valve 51 reaches the target opening degree EAt. In the present embodiment, a valve opening degree EA obtained when the EGR valve 51 is fully opened is 100%, and the valve opening degree EA obtained when the EGR valve 51 is fully closed is 0%.

Air-Fuel Ratio Feedback Control

As one of the various controls for the internal combustion engine 1, the controller 100 executes an air-fuel ratio feedback control. In the air-fuel ratio feedback control, the fuel injection amount Q is corrected based on the air-fuel ratio AF, which is detected by the air-fuel ratio sensor 46, so that the air-fuel ratio of the air-fuel mixture becomes a target air-fuel ratio AFt (e.g., stoichiometric air-fuel ratio). The controller 100 calculates an air-fuel ratio correction value FAF so as to reduce the deviation between the air-fuel ratio AF and the target air-fuel ratio AFt. Specifically, the controller 100 calculates, as the air-fuel ratio correction value FAF, the sum of a proportional element, an integral element, and a differential element that are obtained by inputting the deviation between the target air-fuel ratio Aft and the air-fuel ratio AF. The controller 100 corrects the fuel injection amount Q using the air-fuel ratio correction value FAF so that the air-fuel ratio of the air-fuel mixture converges to the target air-fuel ratio AFt.

Estimation of Alcohol Concentration

The controller 100 executes a process that estimates an alcohol concentration AD of fuel. That is, the air-fuel ratio feedback control is performed in the internal combustion engine 1. As the alcohol concentration AD in the fuel increases, the air-fuel ratio correction value FAF required to obtain the target air-fuel ratio AFt tends to increase toward a rich side. Thus, for example, the controller 100 of the present embodiment executes the process that estimates the alcohol concentration AD in fuel based on the air-fuel ratio correction value FAF that has been calculated to maintain the target air-fuel ratio AFt. To estimate the alcohol concentration AD, the controller 100 calculates the alcohol concentration AD such that the value of the calculated alcohol concentration AD becomes higher as the air-fuel ratio correction value FAF becomes larger toward the rich side. The alcohol concentration AD is estimated with higher accuracy when the degree of deviation between the actual air-fuel ratio AF and the target air-fuel ratio AFt is sufficiently small and such a state continues for a certain period of time.

The alcohol concentration AD of fuel may be estimated in another manner. Alternatively, the alcohol concentration AD of fuel may be directly detected by using, for example, a sensor that detects the alcohol concentration based on the electrical conductivity, capacitance, and the like of the fuel.

Knocking Control

As one of the various controls for the internal combustion engine 1, the controller 100 executes a knocking control. In the knocking control, when the occurrence of knocking is detected using a sensor or the like, the ignition timing is retarded until the occurrence of knocking is stopped. In the knocking control, a basic ignition timing AOPb is calculated based on the engine rotation speed Ne and the engine load factor KL. The basic ignition timing AOPb is a value calculated as the most advanced ignition timing, at which the occurrence of knocking can be limited. When the amount of EGR flowing into the intake passage 20 increases, the combustion of air-fuel mixture becomes so slow that knocking becomes less likely to occur while the engine torque decreases. Thus, a decrease in the engine torque is limited by setting the basic ignition timing AOPb to be more advanced as the setting the target EGR ratio EGp is set to a larger value. Further, a knocking correction amount KH is calculated in correspondence with the occurrence of knocking. A timing obtained by changing the basic ignition timing AOPb to be retarded by the knocking correction amount KH is set as a final ignition timing AOP, thereby executing feedback control of the ignition timing according to the occurrence of knocking.

Increase Correction Control for Fuel at Engine Start

A comparative example will now be described. In a case in which warm-up of the intake port 9 is not completed at engine start, the intake port 9 may have a relatively low wall surface temperature. In this case, some of the fuel injected from the port injection valve 36 collects on the wall surface of the intake port 9. As a result, some of the fuel injected from the port injection valve 36 may become a liquid film. Further, in a case in which warm-up in the cylinder 4 is not completed at engine start, the temperature of the top surface of the piston 5 and the wall surface temperature of the cylinder inner wall **4*b* may be relatively low. In this case, some of the fuel injected from the direct injection valve 35 collects on the top surface of the piston 5 and the wall surface of the cylinder inner wall 4*b*. As a result, some of the fuel injected from the direct injection valve 35 may become a liquid film. When fuel collects in such a manner, the fuel supplied from the fuel injection valves to the combustion chamber 8 may be insufficient. In order to prevent such a situation, the controller 100** of the present embodiment executes an increase correction control for fuel during fuel injection at engine start.

The increase correction control for fuel is executed as follows. When starting the internal combustion engine 1, the controller 100 calculates the fuel injection amount Q in a predetermined calculation cycle. The injection valves 35, 36 are controlled so that the calculated fuel injection amount Q is injected. The calculated fuel injection amount Q is a value obtained by multiplying the basic injection amount Qb by an increase coefficient Kq.

The basic injection amount Qb is a value calculated based on the coolant temperature Tw obtained when a start request of the internal combustion engine 1 was made. The controller 100 calculates the basic injection amount Qb such that the lower the coolant temperature Tw, the larger the value of the basic injection amount Qb.

The increase coefficient Kq is used to correct the fuel injection amount such that the fuel injection amount increases in order to compensate for the collected fuel. The increase coefficient K is set to a value greater than or equal to 1. The initial value of the increase coefficient Kq is set based on the coolant temperature Tw obtained when the start request was made. That is, the initial value of the increase coefficient Kq is set to be larger as the coolant temperature Tw obtained when the start request was made becomes lower. The increase coefficient Kq is updated by multiplying the increase coefficient Kq by a given attenuation coefficient Kg in a predetermined calculation cycle. The value of the attenuation coefficient Kg is greater than 0 and less than 1. Thus, every time the increase coefficient Kq is updated, the value of the increase coefficient Kq decreases. As the value of the increase coefficient Kq decreases, the fuel injection amount Q at engine start decreases over time.

Idle-Up Control at Engine Start

When the start of the internal combustion engine 1 is requested, the coolant temperature Tw may be lower than a given determination value. In this case, if the internal combustion engine 1 needs to be quickly warmed up, the controller 100 executes an idle-up control. The idle-up control increases an idle rotation speed Neid of the internal combustion engine 1 to a given rotation speed.

The idle-up control is executed, for example, as follows. When the internal combustion engine 1 is started, the controller 100 calculates the target idle rotation speed Neidt based on the coolant temperature Tw obtained when the start request of the internal combustion engine 1 was made. The controller 100 calculates the target idle rotation speed Neidt such that the value of the target idle rotation speed Neidt increases as the coolant temperature Tw obtained when the start request of the internal combustion engine 1 was made decreases. The controller 100 calculates a target rotation speed Net in a predetermined calculation cycle. The target rotation speed Net is calculated by multiplying the target idle rotation speed Neidt by an idle-up coefficient Kup.

As described above, the basic injection amount Qb is a value calculated based on the coolant temperature Tw obtained when the start request of the internal combustion engine 1 was made. The controller 100 calculates the basic injection amount Qb such that the lower the coolant temperature Tw, the larger the value of the basic injection amount Qb.

The idle-up coefficient Kup is used to correct the target idle rotation speed Neidt such that the target idle rotation speed Neidt increases. The value of the idle-up coefficient Kup is set to 1 or greater. The initial value of the idle-up coefficient Kup is set based on the coolant temperature Tw obtained when the start request was made. That is, the initial value of the idle-up coefficient Kup is set such that the lower the coolant temperature Tw obtained when the start request of the internal combustion engine 1 was made, the larger the initial value of the idle-up coefficient Kup.

The idle-up coefficient Kup is updated by multiplying the idle-up coefficient Kup by a given attenuation coefficient Kgup in a predetermined calculation cycle. The value of the attenuation coefficient Kgup is greater than 0 and less than 1. Every time the idle-up coefficient Kup is updated in this manner, the value of the idle-up coefficient Kup decreases. Thus, the target rotation speed Net at the start of the internal combustion engine 1 decreases toward the target idle rotation speed Neidt over time.

Estimation of Cylinder Bore Temperature

The controller 100 executes a process that estimates a cylinder bore temperature Tb, which corresponds to the wall surface temperature of the cylinder bore. Specifically, the cylinder bore temperature Tb is the wall surface temperature of the cylinder inner wall 4*b*.

Figure 2:
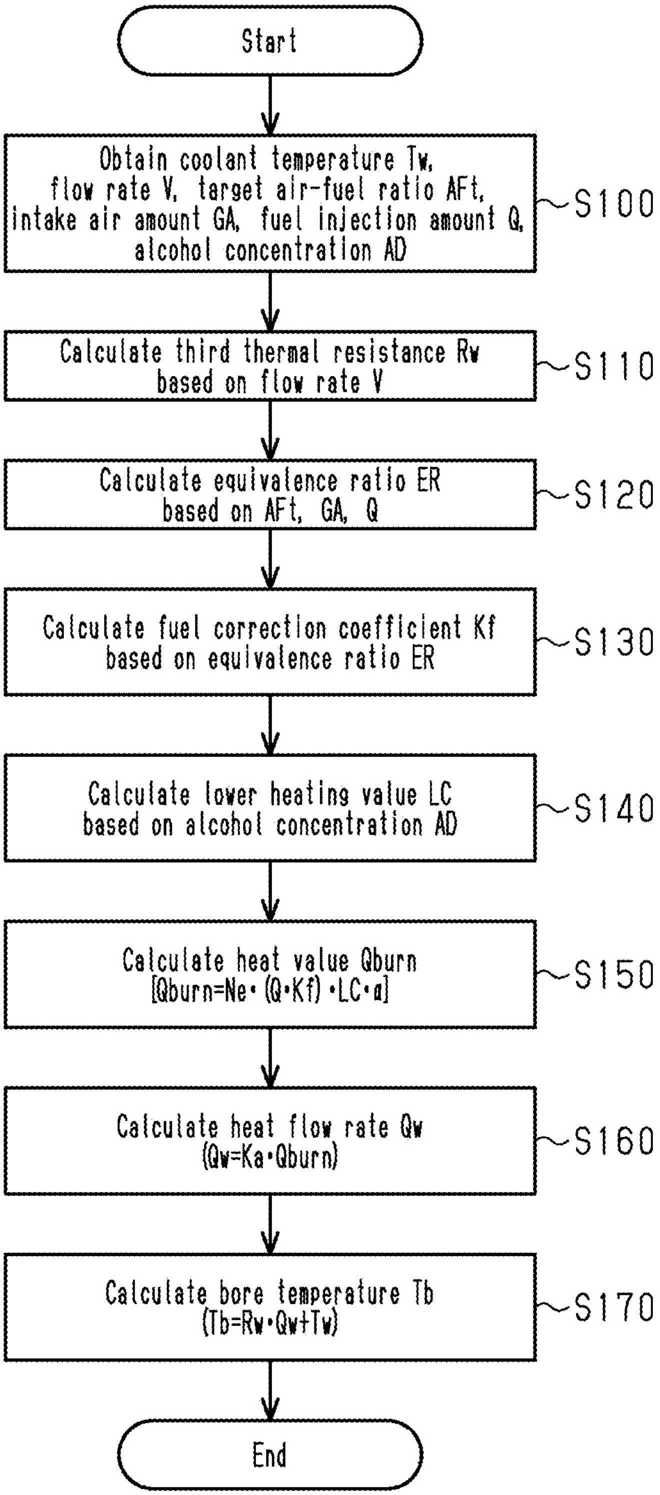
FIG. 2 is a flowchart illustrating a procedure for processes executed by the controller of the embodiment in FIG. 1.

FIG. 2 shows a procedure for a calculation process for the cylinder bore temperature Tb executed by the controller 100. The controller 100 repeatedly executes this process in a given calculation cycle. In the following description, the number of each step is represented by the letter S followed by a numeral.

When starting the process shown in FIG. 2, the controller 100 obtains the coolant temperature Tw, the flow rate V, the target air-fuel ratio AFt, the intake air amount GA, the fuel injection amount Q, and the alcohol concentration AD (S100).

Next, the controller 100 calculates the third thermal resistance Rw based on the flow rate V (S110). The third thermal resistance Rw is related to heat transfer between the cylinder inner wall 4*b* and the coolant in the water jacket 70.

The inventors have found that the third thermal resistance Rw correlates with the flow rate V of the coolant flowing through the water jacket 70. Thus, in the present embodiment, the relationship between the flow rate V and the third thermal resistance Rw is stored in advance in the memory 120 as third thermal resistance mapping data. Based on the mapping data, the controller 100 calculates the third thermal resistance Rw.

Figure 3:
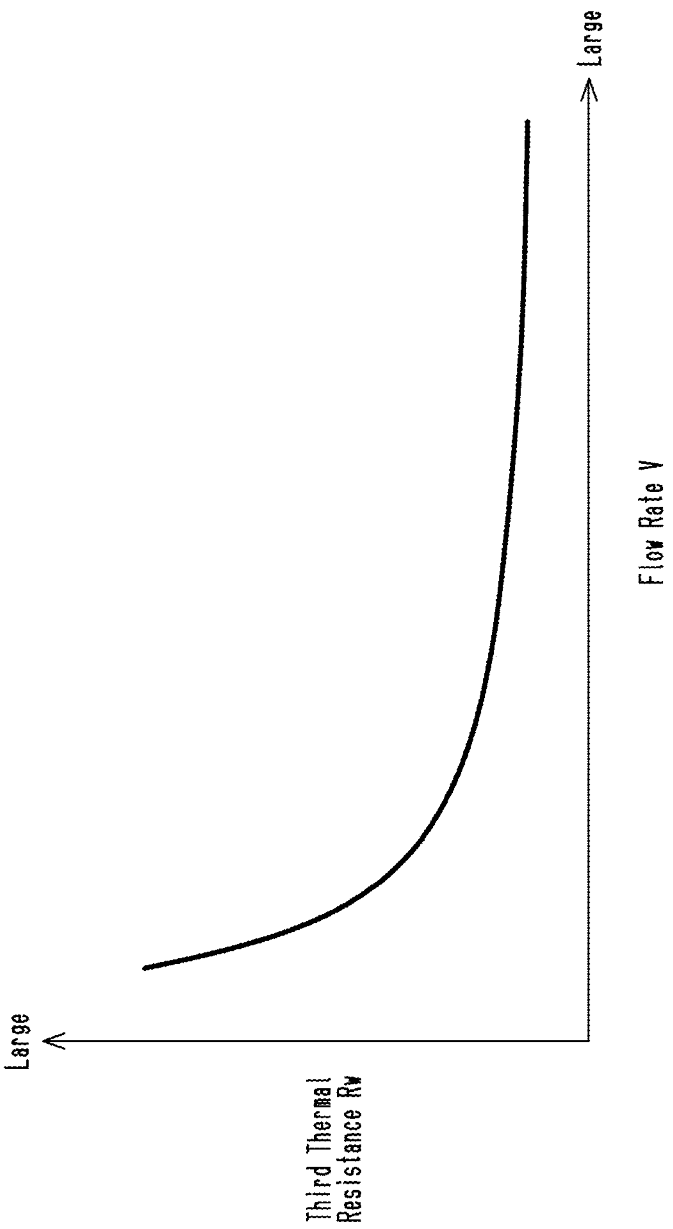
FIG. 3 is a graph showing the relationship between the flow rate of coolant and a third thermal resistance in the internal combustion engine of FIG. 1.

As shown in FIG. 3, in the third thermal resistance mapping data, the value of the third thermal resistance Rw is set such that the calculated value of the third thermal resistance Rw decreases as the flow rate V increases.

Then, the controller 100 calculates the equivalence ratio ER based on the target air-fuel ratio AFt, the intake air amount GA, and the fuel injection amount Q (S120). The fuel injection amount Q is a final fuel injection amount subsequent to being corrected by the air-fuel ratio feedback control. The equivalence ratio ER is a value obtained by dividing the fuel injection amount Q by a fuel injection amount required to obtain the stoichiometric air-fuel ratio in the current intake air amount GA. Thus, when the target air-fuel ratio AFt is smaller than the stoichiometric air-fuel ratio, the equivalence ratio ER becomes a value smaller than 1. The equivalence ratio ER may be calculated by dividing the stoichiometric air-fuel ratio by the air-fuel ratio AF, which is a detection value of the air-fuel ratio.

Subsequently, the controller 100 calculates a fuel correction coefficient Kf based on the equivalence ratio ER (S130). In general, the heating value per unit mass of fuel obtained when the fuel is burned changes according to the air-fuel ratio of air-fuel mixture. Thus, the controller 100 calculates the fuel correction coefficient Kf as a correction value by which the fuel injection amount Q is multiplied in order to correct the difference in the heating value resulting from the difference in the air-fuel ratio. This calculation is performed with reference to the heating value per unit mass of fuel obtained when the air-fuel mixture at the stoichiometric air-fuel ratio is burned.

In the present embodiment, the relationship between the equivalence ratio ER and the fuel correction coefficient Kf is stored in advance in the memory 120 as mapping data. Based on the mapping data, the controller 100 calculates the fuel correction coefficient Kf.

Figure 4:
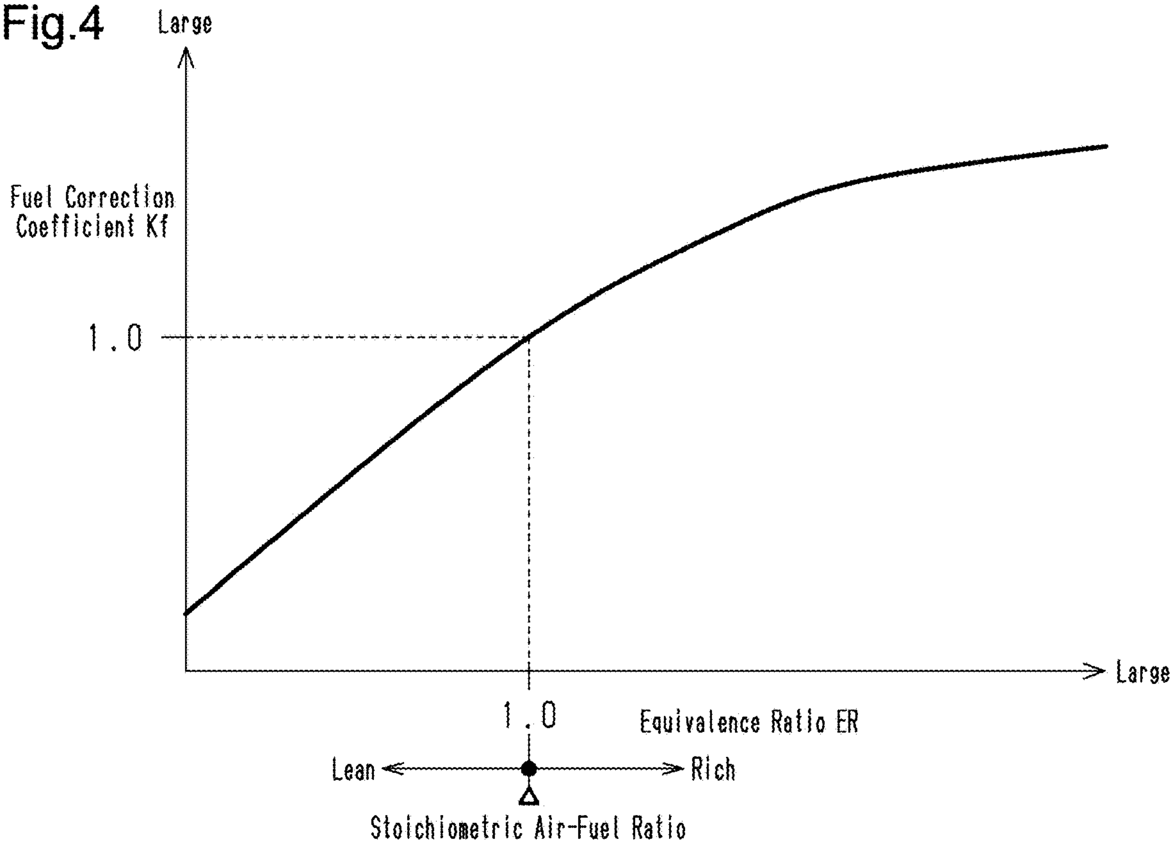
FIG. 4 is a graph showing the relationship between the equivalence ratio and the fuel correction coefficient in the internal combustion engine of FIG. 1.

As shown in FIG. 4, in the mapping data of the fuel correction coefficient Kf, the value of the fuel correction coefficient Kf is set to 1 when the equivalence ratio ER is 1. The value of the fuel correction coefficient Kf is set such that it gradually becomes smaller than 1 as the equivalence ratio ER becomes smaller than 1. The value of the fuel correction coefficient Kf is set such that it gradually becomes larger than 1 as the equivalence ratio ER becomes larger than 1. The fuel injection amount Q is corrected using the fuel correction coefficient Kf in this manner. Thus, when the equivalence ratio ER is smaller than 1, that is, when the air-fuel ratio of the air-fuel mixture is leaner than the stoichiometric air-fuel ratio, the amount of fuel used to calculate the heating value of fuel becomes smaller than the fuel injection amount Q. When the equivalence ratio ER is larger than 1, that is, when the air-fuel ratio of the air-fuel mixture is richer than the stoichiometric air-fuel ratio, the amount of fuel used to calculate the heating value of fuel becomes larger than the fuel injection amount Q.

Next, the controller 100 calculates a lower heating value LC of the fuel based on the alcohol concentration AD (S140). In the present embodiment, the relationship between the alcohol concentration AD and the lower heating value LC is stored in advance in the memory 120 as mapping data. Based on the mapping data, the controller 100 calculates the lower heating value LC.

Figure 5:
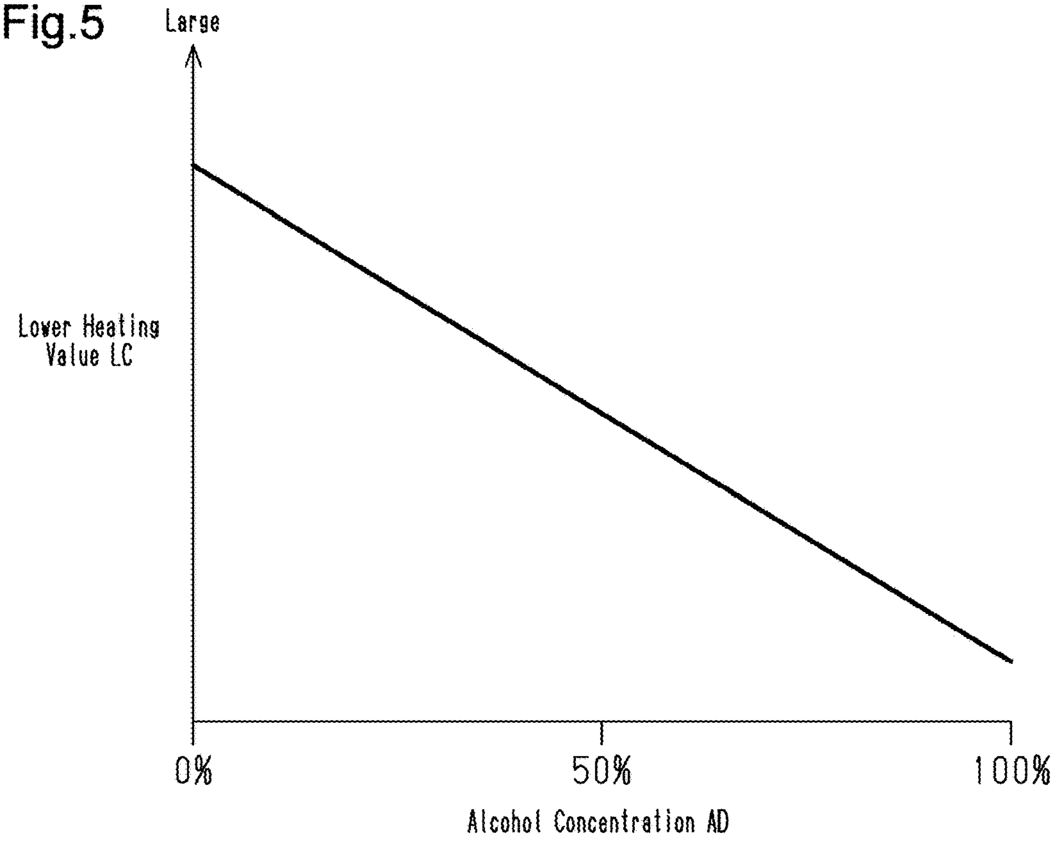
FIG. 5 is a graph showing the relationship between the alcohol concentration and the lower heating value in the internal combustion engine of FIG. 1.

As shown in FIG. 5, in the mapping data of the lower heating value LC, the value of the lower heating value LC is set such that the calculated value of the lower heating value LC decreases as the alcohol concentration AD increases.

Then, the controller 100 uses the following equation (1) to calculate a heating value Qburn per unit time obtained when the fuel supplied into the cylinder 4 of the internal combustion engine 1 burns (S150).

$$Qburn = Ne \cdot (Q \cdot Kf) \cdot LC \cdot \alpha \quad (1)$$

Ne: Engine Rotation Speed

Q: Fuel Injection Amount

Kf: Fuel Correction Coefficient

LC: Lower Heating Value

α: Constant used to adjust unit

The value obtained by Q Kf in the equation (1) is obtained by correcting the fuel injection amount Q for calculation of the heating value in order to correct the heating value per unit mass of fuel that changes according to the air-fuel ratio of air-fuel mixture as described above.

Subsequently, the controller 100 calculates a heat flow rate Qw (S160). The heat flow rate Qw is the amount of heat per unit time that moves from the cylinder inner wall 4*b* to the coolant in the water jacket 70. The controller 100 substitutes, into the heat flow rate Qw, a value obtained by multiplying the heating value Qburn by a coefficient Ka. The coefficient Ka is an adaptation value used to convert the heating value Qburn into the heat flow rate Qw. In the present embodiment, the coefficient Ka is a fixed value. Instead, the coefficient Ka may be a variable value that changes according to, for example, the engine operating state.

Next, the controller 100 calculates the cylinder bore temperature Tb from the following equation (2) based on the third thermal resistance Rw calculated in correspondence with the flow rate V, the thermal flow rate Qw calculated from the heating value of the fuel, and the coolant temperature Tw (S170).

$$Tb = Rw \cdot Qw + Tw \quad (2)$$

Rw: Third Thermal Resistance

Qw: Heat Flow Rate

Tw: Coolant Temperature

After executing the process of S170, the controller 100 ends the execution of the procedure in the current calculation cycle.

Estimation of Piston Temperature

The controller 100 executes a process that calculates a piston temperature Tp, which is the temperature of the top surface of the piston 5. This process will now be described with reference to FIG. 6.

Figure 6:
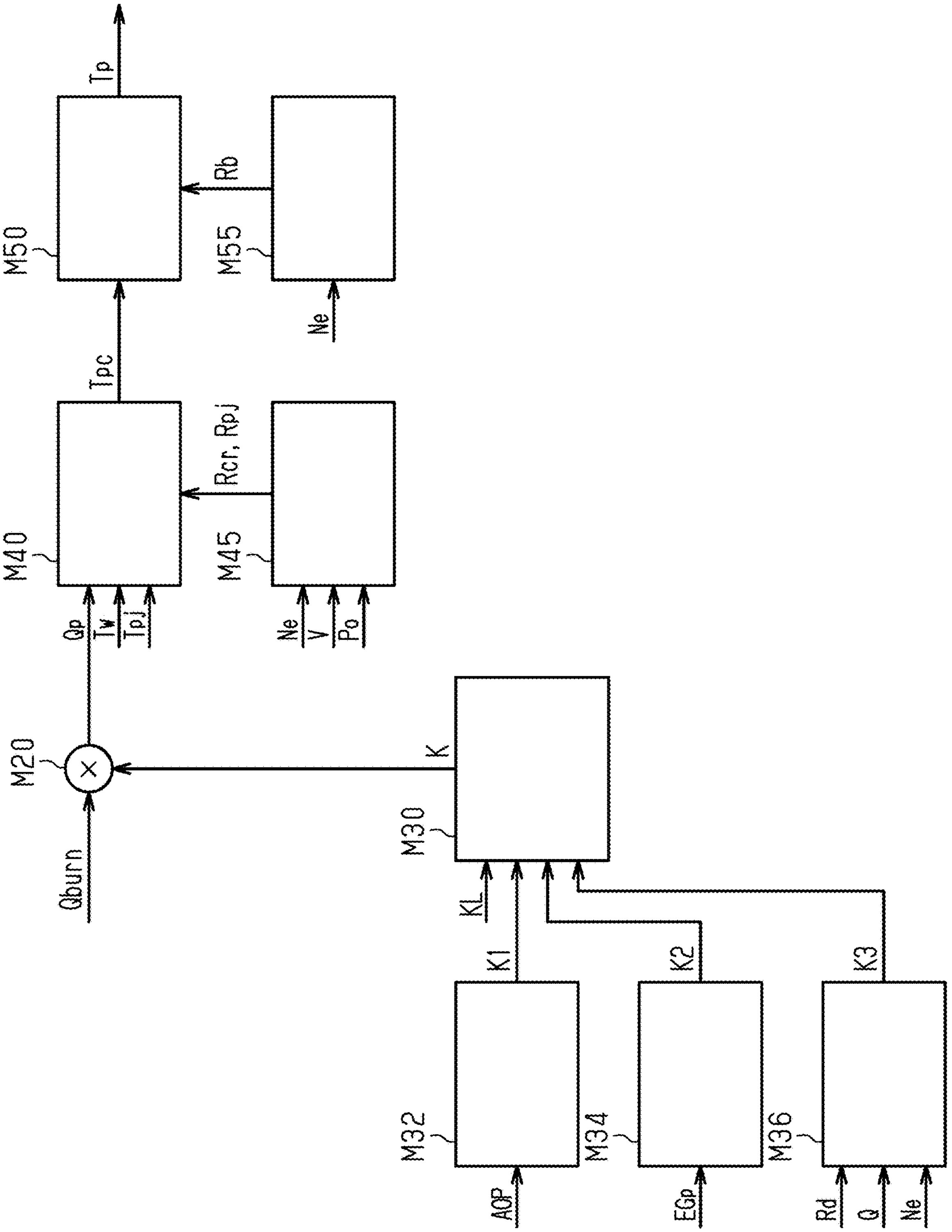
FIG. 6 is a block diagram showing processes executed by the controller of the embodiment in FIG. 1.

FIG. 6 shows a process enabled by the CPU 110 executing the programs stored in the memory 120.

Heat Receiving Amount Calculation Process

A heat receiving amount calculation process M20 is a process that calculates a piston heat receiving amount Qp. The piston heat receiving amount Qp is a heat receiving amount of the piston 5 obtained when the piston 5 receives heat through the combustion of fuel. In the heat receiving amount calculation process M20, the controller 100 obtains the heating value Qburn, calculated by the process of S150 shown in FIG. 2, and a heat receiving amount correction coefficient K. The heat receiving amount correction coefficient K is a value calculated through a correction coefficient calculation process M30, which will be described later. The controller 100 substitutes, into the piston heat receiving amount Qp, a value obtained by multiplying the heating value Qburn by the heat receiving amount correction coefficient K.

Correction Coefficient Calculation Process

The correction coefficient calculation process M30 calculates the heat receiving amount correction coefficient K. The heat receiving amount correction coefficient K is a value that will be multiplied by the heating value Qburn in order to calculate the piston heat receiving amount Qp obtained when the fuel supplied into the cylinder 4 of the internal combustion engine 1 is burned. In the correction coefficient calculation processing M30, the controller 100 first calculates a basic correction coefficient Kb. In the present embodiment, the relationship between the engine load factor KL and the basic correction coefficient Kb is stored in advance in the memory 120 as basic correction coefficient mapping data. The controller 100 calculates the basic correction coefficient Kb based on the basic correction coefficient mapping data and the obtained engine load factor KL. The basic correction coefficient Kb is a value greater than 0 and less than or equal to 1. Basically, the value of the basic correction coefficient Kb is set so as to decrease as the engine load factor KL increases. The basic correction coefficient Kb is a value adapted with reference to an engine operating state in which the knocking correction amount KH is 0, the target EGR rate EGp is 0, and the port injection ratio Rpf is 1.

In the present embodiment, three types of basic correction coefficient mapping data selected according to the engine operating state are prepared in order to calculate an optimal basic correction coefficient Kb. The first basic correction coefficient mapping data is adapted to idling of the internal combustion engine 1. The second basic correction coefficient mapping data is adapted to steady operation of the internal combustion engine 1; that is, an operation other than idling. The third basic correction coefficient mapping data is adapted when a rapid warm-up control of the catalyst 32 is executed in the internal combustion engine 1. Examples of the rapid warm-up control of the catalyst 32 include a significant ignition timing retardation that is not performed during steady operation.

In the correction coefficient calculation processing M30, the controller 100 obtains a first correction coefficient K1, a second correction coefficient K2, and a third correction coefficient K3. The first correction coefficient K1 is a value calculated through a first correction coefficient calculation process M32, which will be described later. The second correction coefficient K2 is a value calculated through a second correction coefficient calculation process M34, which will be described later. The third correction coefficient K3 is a value calculated through a third correction coefficient calculation process M36, which will be described later. The controller 100 calculates a value obtained by multiplying the basic correction coefficient Kb, the first correction coefficient K1, the second correction coefficient K2, and the third correction coefficient K3. The calculated value is substituted into the heat receiving amount correction coefficient K ($K=Kb\cdot K1\cdot K2\cdot K3$).

First Correction Coefficient Calculation Process

The first correction coefficient calculation process M32 calculates the first correction coefficient K1 based on the obtained ignition timing AOP. The first correction coefficient K1 is used so that a decrease in a combustion gas temperature due to the retardation of the ignition timing is reflected on the heating value Qburn. In the present embodiment, the relationship between a retardation percentage RED, which is determined from the ignition timing AOP, and the first correction coefficient K1 is stored in advance in the memory 120 as first correction coefficient mapping data. The controller 100 calculates the first correction coefficient K1 based on the first correction coefficient mapping data and the retardation percentage RED. The first correction coefficient K1 is a value greater than 0 and less than or equal to 1. The value of the first correction coefficient K1 is set to 1 if the first basic correction coefficient mapping data, which is used for idling, or the third basic correction coefficient mapping data, which is used for the rapid warm-up, is selected as the mapping data used to calculate the basic correction coefficient Kb. That is, the correction using the first correction coefficient K1 is not performed.

The retardation percentage RED is a value defined by the following expression: an ignition retardation combustion period (CA)/a minimum advance for the best torque (MBT) combustion period (CA)×100(%). The ignition retardation combustion period, which is expressed by a crank angle, is a combustion period of air-fuel mixture obtained when the air-fuel mixture is ignited at the ignition timing AOP. The MBT combustion period, which is expressed by a crank angle, is a combustion period of air-fuel mixture obtained when the air-fuel mixture is ignited in the MBT. Thus, when the set ignition timing AOP is the MBT, that is, when the retardation amount of the ignition timing is 0, the retardation percentage RED is 100%. The combustion start timing of the air-fuel mixture becomes later as the retardation amount of the ignition timing becomes larger. Thus, the ignition retardation combustion period is shorter than the MBT combustion period. Accordingly, the value of the retardation percentage RED decreases as the ignition timing AOP becomes more retarded. The controller 100 calculates the ignition combustion period based on the ignition timing AOP. Further, the controller 100 calculates the MBT combustion period based on the engine operating state (e.g., engine rotation speed Ne). By calculating the retardation percentage RED, the value related to the retardation of the ignition timing is made dimensionless. Hence, the first correction coefficient mapping data is applicable to an internal combustion engine having a displacement different from that of the internal combustion engine 1.

Figure 7:
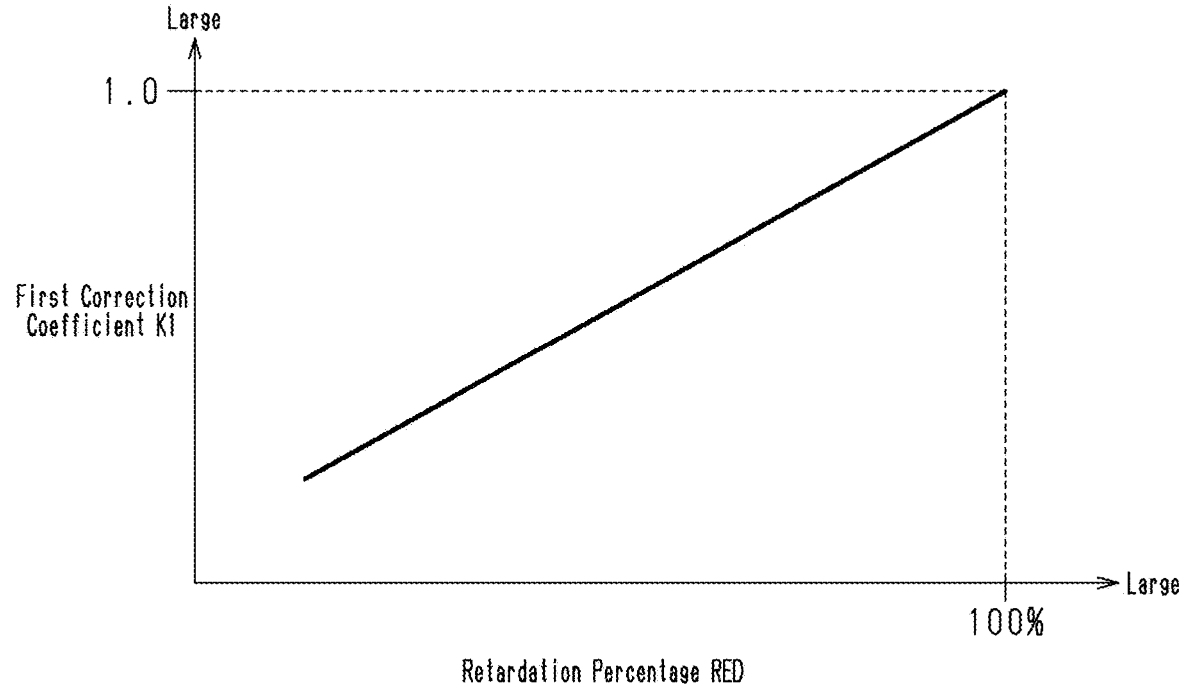
FIG. 7 is a graph showing the relationship between the first correction coefficient, shown in FIG. 6, and a retardation percentage.

As shown in FIG. 7, in the first correction coefficient mapping data, the value of the first correction coefficient K1 is set to 1 when the retardation percentage RED is 100%. The value of the first correction coefficient K1 is set so as to gradually become smaller than 1 as the retardation percentage RED becomes smaller than 100%.

Second Correction Coefficient Calculation Process

The second correction coefficient calculation process M34 calculates the second correction coefficient K2 based on the obtained target EGR rate EGp. The second correction coefficient K2 is used so that a decrease in a combustion gas temperature due to external EGR is reflected on the heating value Qburn. In the present embodiment, the relationship between an advancement percentage ADD, which is determined from the target EGR ratio EGp, and the second correction coefficient K2 is stored in advance in the memory 120 as second correction coefficient mapping data. The controller 100 calculates the second correction coefficient K2 based on the second correction coefficient mapping data and the advancement percentage ADD. The second correction coefficient K2 is a value greater than 0 and less than or equal to 1. The value of the second correction coefficient K2 is set to 1 if the first basic correction coefficient mapping data or the third basic correction coefficient mapping data is selected as the mapping data used to calculate the basic correction coefficient Kb. That is, the correction using the second correction coefficient K2 is not performed.

The advancement percentage ADD is a value defined by the following expression: the MBT combustion period (CA) in a case in which EGR gas is recirculated/the MBT combustion period (CA) in a case in which EGR gas is not recirculated×100(%). As described above, the MBT combustion period, which is expressed by a crank angle, is a combustion period of air-fuel mixture obtained when the air-fuel mixture is ignited in the MBT. Thus, when the recirculation of EGR gas is not performed, that is, when the target EGR rate EGp is 0%, the advancement ratio ADD is 100%. The timing of the MBT becomes more advanced as the value of the target EGR rate EGp becomes larger. Accordingly, the MBT combustion period in the case in which the recirculation of EGR gas is performed becomes longer toward the advance side than the MBT combustion period in the case in which the recirculation of EGR gas is not performed. Accordingly, as the value of the target EGR rate EGp increases, the value of the advancement percentage ADD increases beyond 100%. The controller 100 calculates the advancement percentage ADD based on the engine operating state such as the target EGR rate EGp and the engine rotation speed Ne. By obtaining the advancement percentage ADD, the value related to external EGR is made dimensionless. Hence, the second correction coefficient mapping data is applicable to an internal combustion engine having a displacement different from that of the internal combustion engine 1.

Figure 8:
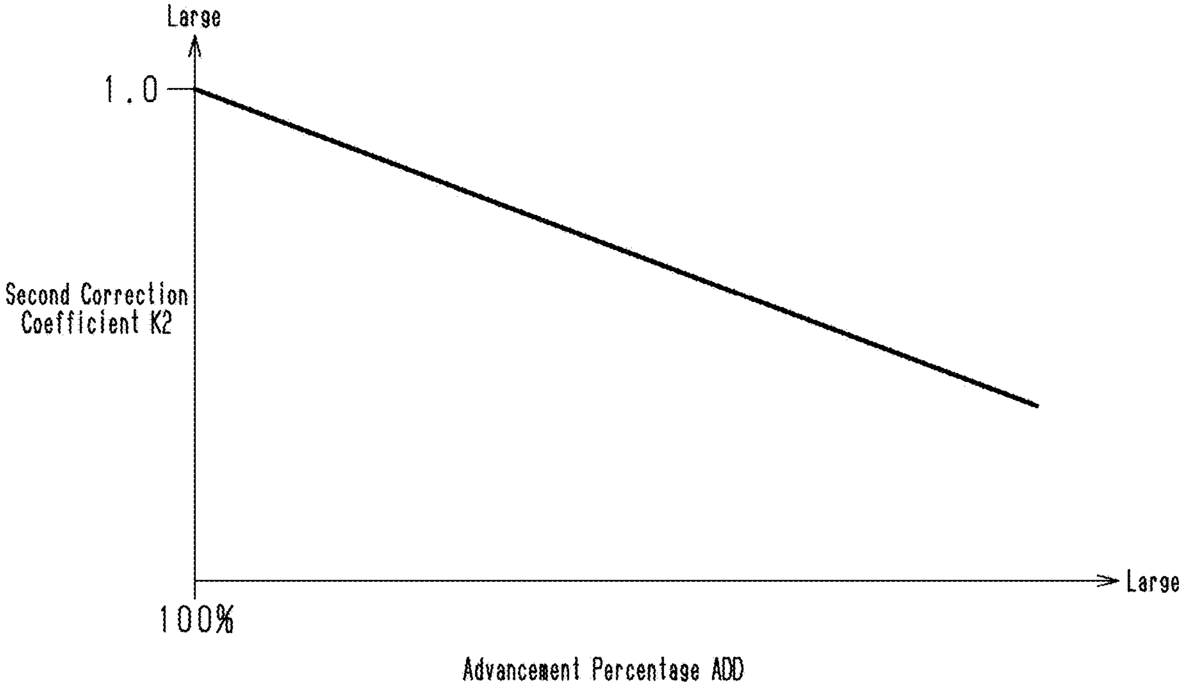
FIG. 8 is a graph showing the relationship between the second correction coefficient, shown in FIG. 6, and an advancement percentage.

As shown in FIG. 8, in the second correction coefficient mapping data, the value of the second correction coefficient K2 is set to 1 when the advancement percentage ADD is 100%. The value of the second correction coefficient K2 is set so as to gradually become smaller than 1 as the advancement percentage ADD becomes larger than 100%.

Third Correction Coefficient Calculation Process

The third correction coefficient calculation process M36 calculates the third correction coefficient K3 based on the obtained direct injection ratio Rd, fuel injection amount Q, and intake air amount GA. The third correction coefficient K3 is used so that a decrease in the combustion gas temperature due to latent heat of evaporation of the fuel injected into the cylinders is reflected on the heating value Qburn. In the present embodiment, the relationship between the in-cylinder percentage DD, obtained from the direct injection ratio Rd and the fuel injection amount Q, and the third correction coefficient K3 is stored in advance in the memory 120 as third correction coefficient mapping data. The controller 100 calculates the third correction coefficient K3 based on the third correction coefficient mapping data and the in-cylinder percentage DD. The third correction coefficient K3 is a value greater than 0 and less than or equal to 1.

The in-cylinder percentage DD is a value defined by the following expression: the direct injection amount (mg/st)/theoretical fuel injection amount (mg/st) in a case in which the engine load factor KL is 100%. The in-cylinder percentage DD is calculated by the controller 100. The direct injection amount is a value obtained by multiplying the direct injection ratio Rd by the fuel injection amount Q. The direct injection amount is calculated by the controller 100. The theoretical fuel injection amount is required to obtain a stoichiometric air-fuel ratio. The theoretical fuel injection amount in the case in which the engine load factor KL is 100% is calculated by the controller 100 based on the engine rotation speed Ne, predefined mapping data, and the like. Thus, when the direct injection amount is 0, that is, when the direct injection ratio Rd is 0 and the port injection ratio Rpf is 1, the in-cylinder ratio DD is 0%. The direct injection amount increases as the value of the direct injection ratio Rd increases. Thus, as the direct injection ratio Rd increases, the value of the in-cylinder percentage DD increases. By obtaining the in-cylinder percentage DD, the value related to the direct injection amount is made dimensionless. Hence, the third correction coefficient mapping data is applicable to an internal combustion engine having a displacement different from that of the internal combustion engine 1.

Figure 9:
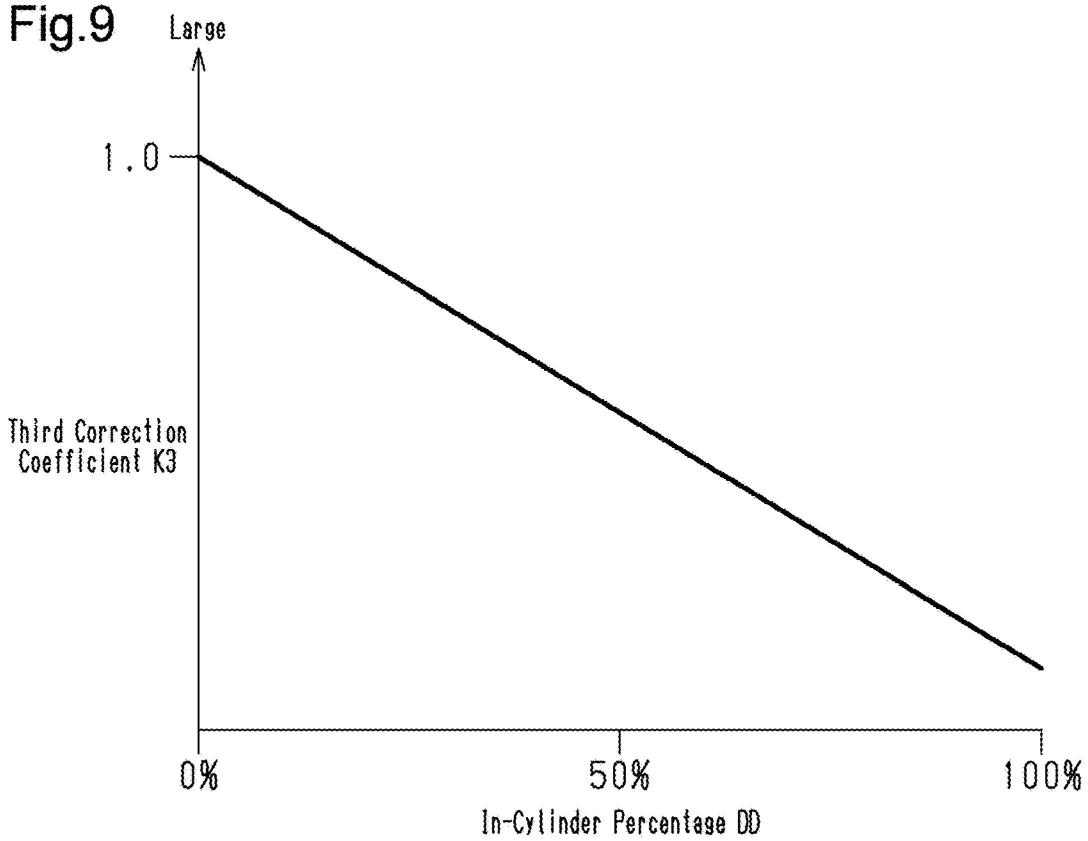
FIG. 9 is a graph showing the relationship between the third correction coefficient, shown in FIG. 6, and an in-cylinder percentage.

As shown in FIG. 9, in the third correction coefficient mapping data, the value of the third correction coefficient K3 is set to 1 when the in-cylinder percentage DD is 0%. The value of the third correction coefficient K3 is set so as to gradually become smaller than 1 as the in-cylinder percentage DD becomes larger.

Converged Piston Temperature Calculation Process

A converged piston temperature calculation process M40 calculates a converged piston temperature Tpc. The converged piston temperature Tpc is a temperature to which the piston temperature Tp in the current thermal balance state will converge. In the converged piston temperature calculation process M40, the controller 100 obtains the piston heat receiving amount Qp, the coolant temperature Tw, a jet oil temperature Tpj, which is the temperature of the lubricating oil injected from the oil jet 80, a combined thermal resistance Rcr, and a fourth thermal resistance Rpj. The controller 100 obtains the oil temperature To as a value indicating the jet oil temperature Tpj. The combined thermal resistance Rcr and the fourth thermal resistance Rpj are values calculated by a thermal resistance calculation process M45, which will be described later.

When lubricating oil is injected from the oil jet 80, the controller 100 calculates the converged piston temperature Tpc using the following equation (3), which is obtained based on a thermal circuit model. When no lubricating oil is injected from the oil jet 80, the controller 100 calculates the converged piston temperature Tpc using the following equation (4), which is obtained based on a thermal circuit model.

$$Tpc = \frac{Rcr \cdot Rpj}{Rcr + Rpj}\left(Qp + \frac{Tw}{Rcr} + \frac{Tpj}{Rpj}\right) \quad (3)$$

$$Tpc = Rcr \cdot Qp + Tw \quad (4)$$

Thermal Resistance Calculation Process

The thermal resistance calculation process M45 calculates the combined thermal resistance Rcr and the fourth thermal resistance Rpj. The combined thermal resistance Rcr is the sum of a second thermal resistance Rb and the third thermal resistance Rw. The second thermal resistance Rb is related to heat transfer between the piston 5 and the cylinder inner wall 4*b*. The third thermal resistance Rw is related to heat transfer between the cylinder inner wall 4*b* and the coolant in the water jacket 70. The fourth thermal resistance Rpj is related to heat transfer between the lubricating oil injected from the oil jet 80 and the piston 5.

As the engine rotation speed Ne increases, the number of slides between the piston 5 and the cylinder inner wall 4*b* increases. This increases the amount of heat transferred from the piston 5 to the cylinder inner wall 4*b*. Thus, as the engine rotation speed Ne increases, the second thermal resistance Rb tends to decrease. As described above, as the flow rate V of the coolant flowing through the water jacket 70 increases, the amount of heat transferred from the cylinder inner wall 4*b* to the coolant increases. Thus, the third thermal resistance Rw tends to decrease as the flow rate V increases. Accordingly, as the engine rotation speed Ne or the flow rate V of the coolant becomes greater, the combined thermal resistance Rcr tends to become smaller.

Thus, in the present embodiment, the relationship between the engine rotation speed Ne, the flow rate V, and the combined thermal resistance Rcr is stored in advance in the memory 120 as combined thermal resistance mapping data. The controller 100 obtains the engine rotation speed Ne and the flow rate V. The combined thermal resistance Rcr is calculated based on the obtained engine rotation speed Ne and flow rate V and the combined thermal resistance mapping data.

Figure 10:
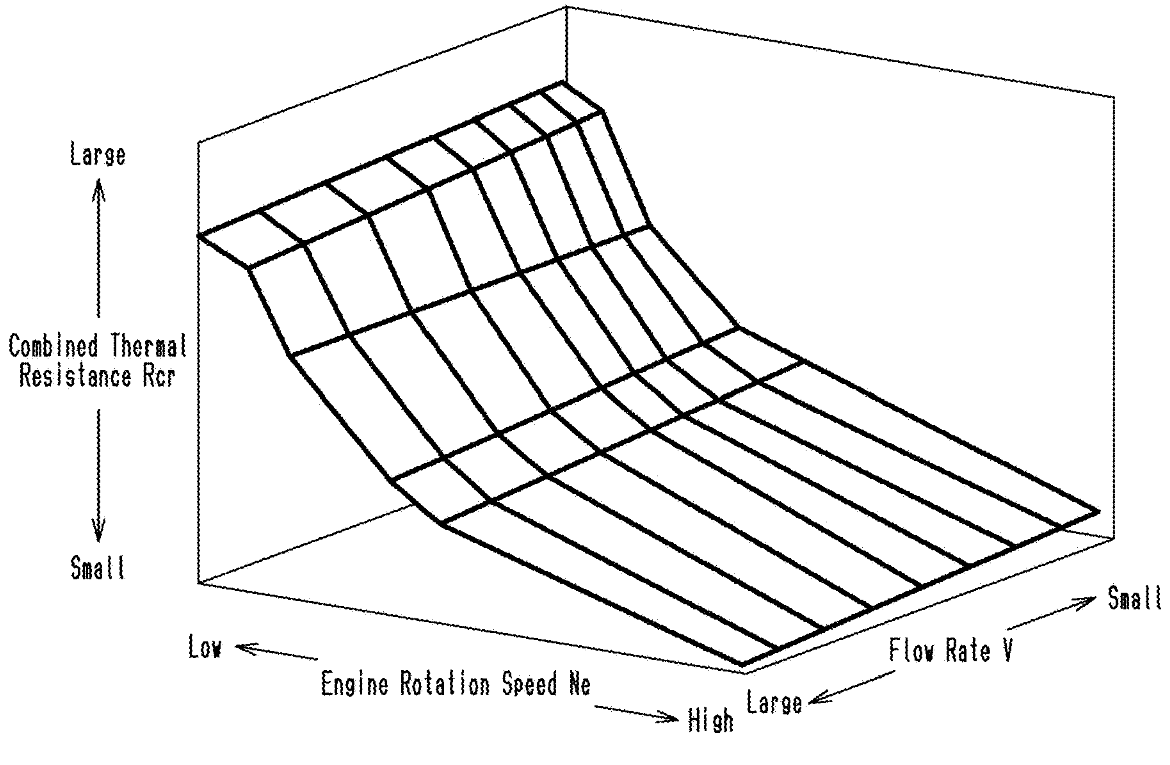
FIG. 10 shows the relationship between the engine rotation speed shown in FIG. 6, the flow rate of coolant shown in FIG. 6, and the combined thermal resistance.

As shown in FIG. 10, in the combined thermal resistance mapping data, the value of the combined thermal resistance Rcr is set such that the higher the engine rotation speed Ne, the smaller the value of the combined thermal resistance Rcr. Further, in the combined thermal resistance mapping data, the value of the combined thermal resistance Rcr is set such that the value of the combined thermal resistance Rcr decreases as the flow rate V increases.

As the hydraulic pressure Po increases, the flow rate of the lubricating oil supplied from the oil jet 80 to the piston 5 increases. This increases the amount of heat transferred from the piston 5 to the lubricating oil. As a result, the fourth thermal resistance Rpj tends to decrease as the hydraulic pressure Po increases.

Thus, in the present embodiment, the relationship between the hydraulic pressure Po and the fourth thermal resistance Rpj is stored in advance in the memory 120 as fourth thermal resistance mapping data. The controller 100 obtains the hydraulic pressure Po. The fourth thermal resistance Rpj is calculated based on the obtained hydraulic pressure Po and flow rate V and the fourth thermal resistance mapping data. When the amount of lubricating oil supplied from the oil jet 80 to the piston 5 can be obtained, the fourth thermal resistance Rpj may be calculated based on the amount of lubricating oil supplied instead of the oil pressure Po.

Figure 11:
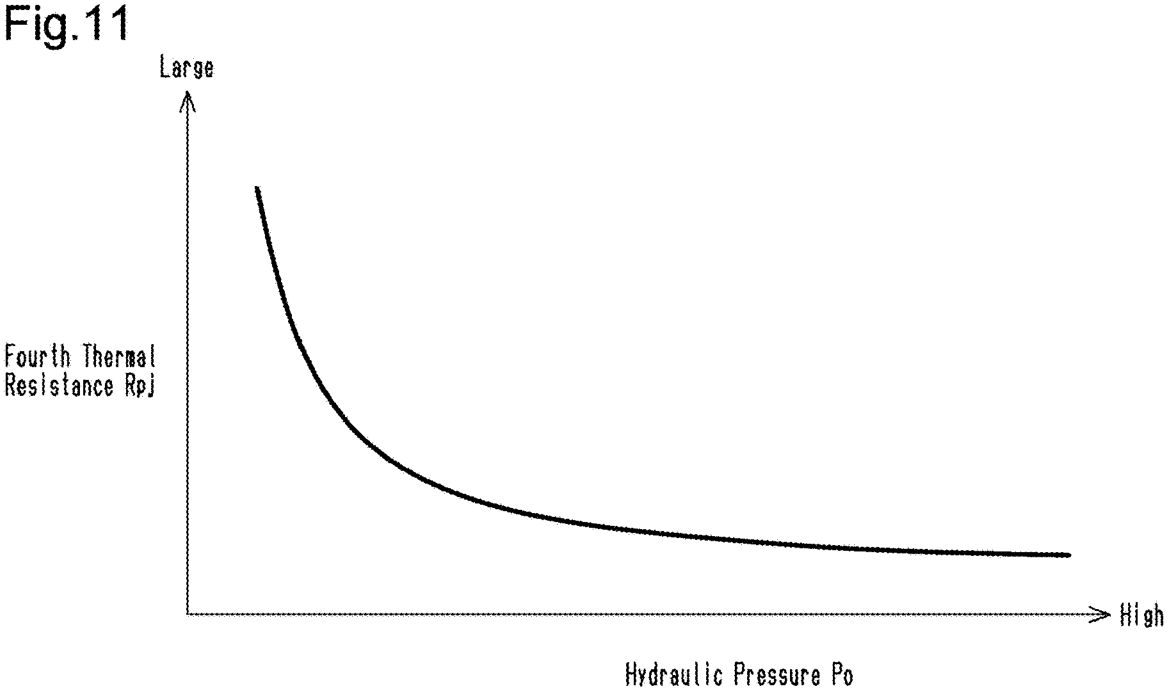
FIG. 11 is a graph showing the relationship between the hydraulic pressure and the fourth thermal resistance in the internal combustion engine of FIG. 1.

As shown in FIG. 11, in the fourth thermal resistance mapping data, the value of the fourth thermal resistance Rpj is set such that the value of the fourth thermal resistance Rpj decreases as the hydraulic pressure Po increases.

Piston Temperature Calculation Process

A piston temperature calculation process M50 is a process that calculates the piston temperature Tp. In the piston temperature calculation process M50, the controller 100 obtains the converged piston temperature Tpc and the second thermal resistance Rb. The second thermal resistance Rb is a value calculated by a second thermal resistance calculation process M55, which will be described later.

The piston temperature Tp is a first-order lag of the converged piston temperature Tpc. Thus, the controller 100 calculates the piston temperature Tp based on the following equation (5) that performs a first-order lag process on the converged piston temperature Tpc.

$$Tp = \frac{1}{1 + Rpb \cdot Cp \cdot s} \cdot Tpc \tag{5}$$

The value of Rpb in equation (5) is the harmonic mean of the first thermal resistance Rp and the second thermal resistance Rb. The first thermal resistance Rp is related to heat transfer between combustion gas and the piston 5, and is a given value obtained in advance. The value of Cp in equation (5) is the heat capacity of the piston 5, and is a given value obtained in advance.

Second Thermal Resistance Calculation Process

The second thermal resistance calculation process M55 is a process that calculates the second thermal resistance Rb, which is related to the heat transfer between the piston 5 and the cylinder inner wall 4*b*. As described above, the second thermal resistance Rb tends to decrease as the engine rotation speed Ne increases.

Thus, in the present embodiment, the relationship between the engine rotation speed Ne and the second thermal resistance Rb is stored in advance in the memory 120 as second thermal resistance mapping data. In the second thermal resistance mapping data, the value of the second thermal resistance Rb is set such that the value of the second thermal resistance Rb decreases as the engine rotation speed Ne increases. The controller 100 obtains the engine rotation speed Ne. The controller 100 calculates the second thermal resistance Rb based on the obtained engine rotation speed Ne and the second thermal resistance mapping data. The second thermal resistance Rb may be calculated using the combined thermal resistance mapping data. For example, the value of the combined thermal resistance Rcr calculated based on the engine rotation speed Ne at the flow rate V of 0 may be substituted into the value of the second thermal resistance Rb.

Control for Improving Fuel Economy at Engine Start

Figure 12:
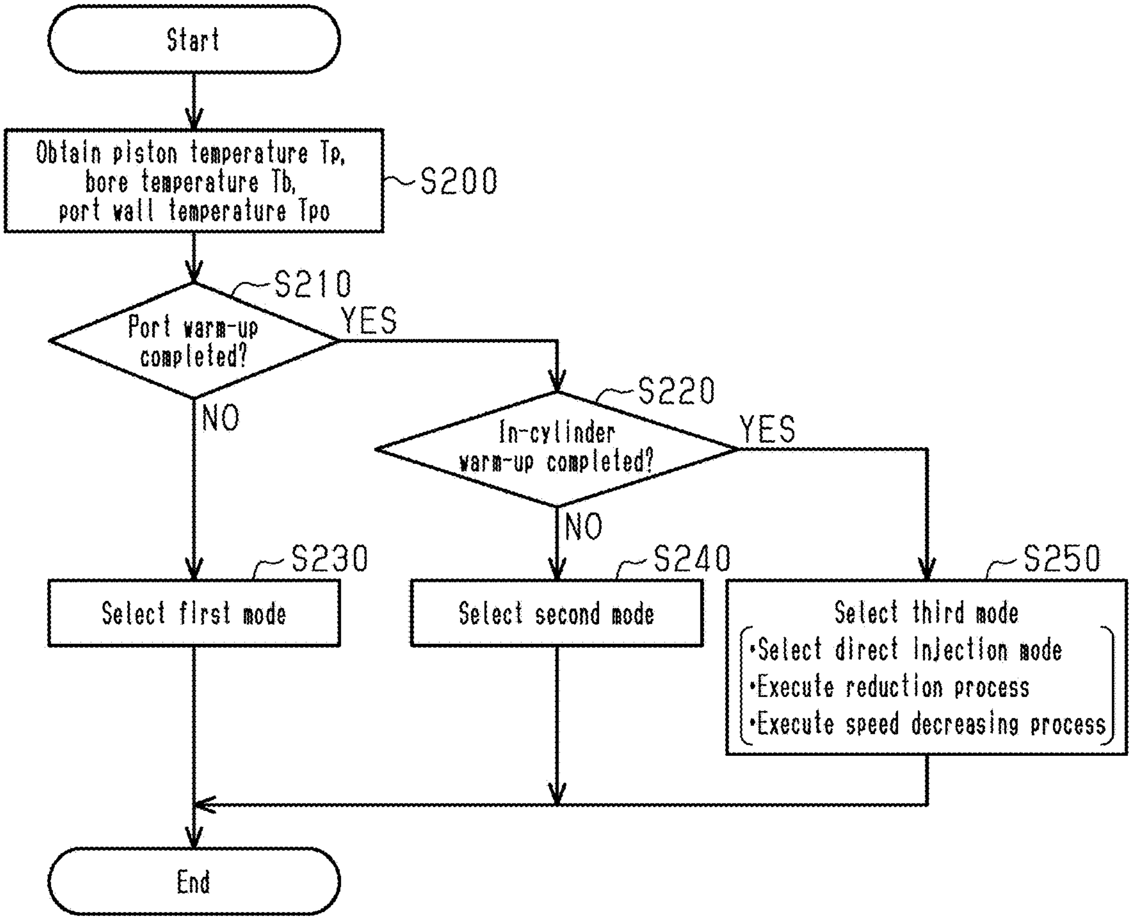
FIG. 12 is a flowchart illustrating a procedure for processes executed by the controller of the embodiment in FIG. 1.

FIG. 12 shows a procedure for processes executed by the controller 100 to improve the fuel economy at engine start. The controller 100 repeatedly executes a series of processes shown in FIG. 12 at a given interval until it is determined that complete warm-up of the internal combustion engine 1 is completed when the coolant temperature Tw becomes greater than or equal to a given determination value TWref during the engine start. In the following description, the number of each step is represented by the letter S followed by a numeral.

When starting the process shown in FIG. 12, the controller 100 obtains the piston temperature Tp calculated by the above process, the cylinder bore temperature Tb calculated by the above process, and a port wall temperature Tpo (S200). The port wall temperature Tpo is the temperature of the wall surface of the intake port 9. The port wall temperature Tpo is similar to the coolant temperature Tw. Thus, the controller 100 obtains the coolant temperature Tw as a substitute value for the port wall temperature Tpo.

Next, the controller 100 determines whether port warm-up, which is warm-up of the intake port 9, is completed (S210). In the process of S210, the controller 100 determines that the port warm-up is completed when the port wall temperature Tpo is greater than or equal to a given determination value Tporef.

When determining through the process of S210 that the port warm-up is not completed (S210: NO), the controller 100 selects a first mode (S230).

When the first mode is selected, for example, the dual injection mode or the direct injection mode is selected as the fuel injection mode during engine start based on the engine rotation speed Ne and the engine load factor KL.

When determining through the process of S210 that the port warm-up is completed (S210: YES), the controller 100 executes a determination process that determines whether in-cylinder warm-up, which is warm-up in the cylinder 4, is completed (S220). In the determination process of S220, the controller 100 determines that the in-cylinder warm-up is completed when the piston temperature Tp is greater than or equal to a given determination value Tpref or when the cylinder bore temperature Tb is greater than or equal to a given determination value Tbref.

When determining through the process of the S220 that the in-cylinder warm-up is not completed (S220: NO), that is, when the piston temperature Tp is less than the determination value Tpref and the cylinder bore temperature Tb is less than the determination value Tbref, the controller 100 selects a second mode (S240).

When the second mode is selected, for example, the port injection mode, the dual injection mode, or the direct injection mode is selected as the fuel injection mode during engine start based on the engine rotation speed Ne and the engine load factor KL.

When determining through the process of S220 that the in-cylinder warm-up is completed (S220: YES), the controller 100 selects a third mode (S250).

When the third mode is selected, the direct injection mode is selected as the fuel injection mode during engine start regardless of the engine rotation speed Ne and the engine load factor KL. In addition, when the third mode is selected, the controller 100 executes a reduction process and a speed decreasing process in combination.

The reduction process is a process that sets an increase correction amount of fuel obtained through the increase correction control to be less than an increase correction amount obtained prior to the execution of the direct injection mode. Specifically, the value of the attenuation coefficient Kg obtained when the third mode is selected is set to a given value Kgd defined in advance. The given value Kgd is smaller than the value of the attenuation coefficient Kg set before the third mode is selected. Thus, every time the increase coefficient Kq is updated, the value of the increase coefficient Kq decreases more quickly. As the value of the increase coefficient Kq decreases mode quickly, the fuel injection amount Q at engine start decreases more quickly over time.

The attenuation speed of the increase correction amount of fuel obtained when the reduction process is executed may exceed the speed of correcting the fuel injection amount through the air-fuel ratio feedback control. In this case, if the air-fuel ratio temporarily becomes leaner, the amount of NOx generated may increase. Thus, the value Kgd is set such that the attenuation speed of the increase correction amount obtained through the reduction process does not exceed the speed of correcting the fuel injection amount through the air-fuel ratio feedback control.

In the speed decreasing process, the decreasing speed of an increase amount of the idle rotation speed Neid is set to be higher than that obtained prior to the execution of the direct injection mode. That is, in the speed decreasing process, the engine rotation speed Ne increased by the idle-up control is reduced more quickly. In the present embodiment, for example, a process that sets the value of the idle-up coefficient Kup to 1 is executed as the speed decreasing process. When the value of the idle-up coefficient Kup is set to 1, the increase amount of the idle rotation speed Neid becomes 0. Thus, an increase in the idle rotation speed Neid is immediately stopped. Accordingly, the engine rotation speed Ne quickly decreases to the target idle rotation speed Neidt.

After executing the process of S230, S240, or S250, the controller 100 ends the execution of the procedure in the current cycle.

Operation

The operation of the present embodiment will now be described.

Figure 13:
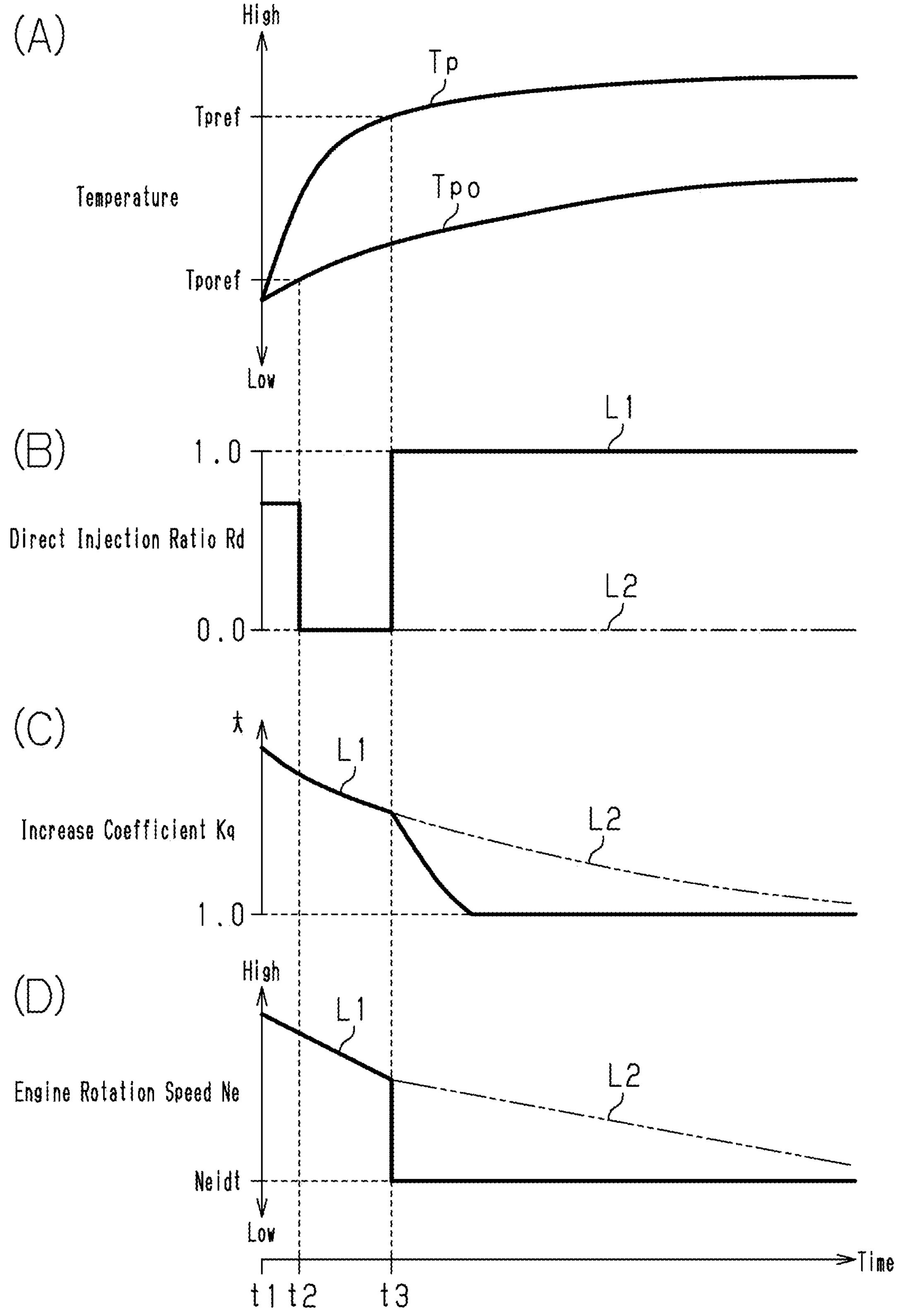
FIG. 13 is a timing diagram showing changes in values obtained when the engine in FIG. 1 is started, in which section (A) of FIG. 13 shows changes in the piston temperature and the port wall temperature, section (B) of FIG. 13 shows changes in the direct injection ratio, section (C) of FIG. 13 shows changes in the increase coefficient of fuel, and section (D) of FIG. 13 shows changes in the engine rotation speed.

FIG. 13 shows changes in the values at engine start. Section (A) of FIG. 13 shows changes in the piston temperature and the port wall temperature. Section (B) of FIG. 13 shows changes in the direct injection ratio. Section (C) of FIG. 13 shows changes in the increase coefficient of fuel. Section (D) of FIG. 13 shows changes in the engine rotation speed. The changes shown by the solid lines L1 in FIG. 13 indicate changes in each value in the present embodiment. The changes shown by the long dashed double-short dashed lines L2 in FIG. 13 indicate comparative examples, in which changes occur in each value obtained when the port injection mode is executed instead of the direct injection mode in the third mode.

As shown in section (A) of FIG. 13, when the engine is started at time t1, the port wall temperature Tpo and the piston temperature Tp increase.

Until the port wall temperature Tpo reaches the determination value Tporef, fuel injection in the first mode is performed as shown in section (B) of FIG. 13.

As shown in section (C) of FIG. 13, when the engine start is started at time t1, the increase correction control for fuel is started to calculate the increase coefficient Kq. This increases the fuel injection amount. The increase coefficient Kq gradually decreases toward 1 over time.

As shown in part (D) of FIG. 13, when the engine is started at time t1, the idle-up control is started so that the engine rotation speed Ne becomes higher than the target idle speed Neidt. The increased engine rotation speed Ne gradually decreases toward the target idle rotation speed Neidt over time.

As shown in section (A) of FIG. 13, at time t2, the port wall temperature Tpo reaches the determination value Tporef at time t2 so that it is determined that the port warm-up is completed. Then, as shown in section (B) of FIG. 13, the fuel injection is performed in the second mode.

As shown in section (A) of FIG. 13, at time t3, the piston temperature Tp reaches the determination value Tpref so that it is determined that the in-cylinder warm-up is completed. Then, the direct injection mode is performed by selecting the third mode.

When the third mode is selected, the reduction process is executed. As shown in section (C) of FIG. 13, the value of the increase coefficient Kq in a case in which the reduction process is executed decreases more quickly than the changes in the increase coefficient K in a case in which the port injection mode, which is shown by the long dashed double-short dashed line L2, is executed. As the value of the increase coefficient Kq decreases mode quickly, the increase correction amount of the fuel injection amount decreases more quickly over time.

Further, when the third mode is selected, the speed decreasing process is executed. As shown in section (D) of FIG. 13, the engine rotation speed Ne decreases to the target idle rotation speed Neidt more quickly when the speed decreasing process is executed than when the engine rotation speed Ne changes in a case in which the port injection mode, which is shown by the long dashed double-short dashed line L2 as the comparative example, is executed.

Advantages

The advantages of the present embodiment will now be described.

(1) At engine start, the temperature in the cylinder 4 increases faster than the temperature of the intake port 9, which is similar to the coolant temperature Tw of the internal combustion engine 1. When the warm-up in the cylinder 4 is completed, the fuel injected from the direct injection valve 35 is quickly vaporized without forming a liquid film even if the fuel collects on the piston 5 or the cylinder inner wall 4*b*. This limits generation of particulate matter that would be produced by the formation of droplets from fuel in a state of a liquid film. Further, when fuel is injected only from the direct injection valve 35, the injected fuel is unlikely to collect on the intake port 9. Thus, as compared with when fuel is injected from the port injection valve 36, the increase correction amount of fuel obtained through the increase correction control is reduced.

In the present embodiment, it is determined whether the warm-up in the cylinder 4 is completed based on the piston temperature Tp and the cylinder bore temperature Tb (S220 in FIG. 12). When it is determined that the warm-up in the cylinder 4 is completed (S220: YES), the process of S250 shown in FIG. 12 is executed. When the process of S250 is executed, the third mode is selected. When the third mode is selected, the controller 100 executes the direct injection mode, which injects fuel only from direct injection valve 35. When the direct injection mode is executed, the reduction process is executed to set the increase correction amount of fuel obtained through the increase correction control to be less than the increase correction amount obtained prior to the execution of the direct injection mode. Thus, the increase correction amount of fuel decreases more quickly than the comparative example, in which the increase correction control is performed based on the coolant temperature Tw. This improves the fuel economy at engine start.

(2) When the third mode is selected to execute the direct injection mode, the engine rotation speed Ne is quickly reduced by executing the speed decreasing process. A quick decrease in the engine rotation speed Ne decreases the number of fuel injections per unit time. This also improves the fuel economy at engine start.

(3) The process that suspends an increase in the idle rotation speed is executed as the speed decreasing process. When the increase in the idle rotation speed is suspended, the increase amount of the idle rotation speed immediately becomes 0. This allows the above advantage resulting from the speed decreasing process to be maximized.

(4) The cylinder bore temperature Tb is a value that correlates with the heating value obtained when the fuel supplied into the cylinder 4 of the internal combustion engine 1 burns, the temperature of coolant that cools the cylinder 4, and the thermal resistance between the cylinder 4 and the coolant. The inventors have found that the thermal resistance correlates with the flow rate V of the coolant flowing through the water jacket 70. In the present embodiment, the cylinder bore temperature Tb is calculated based on the flow rate V of the coolant flowing through the water jacket 70, the coolant temperature Tw, and the heating value Qburn obtained when fuel burns. This allows the cylinder bore temperature Tb to be accurately calculated. Accurate calculation of the cylinder bore temperature Tb improves the accuracy of determining whether the in-cylinder warm-up in the process of the S220 shown in FIG. 12.

(5) To calculate the heating value Qburn, the fuel injection amount Q is corrected by the fuel correction coefficient Kf. Thus, the heating value Qburn is calculated in consideration of the heating value per unit mass of fuel that changes according to the air-fuel ratio of air-fuel mixture. Accordingly, the estimation accuracy of the cylinder bore temperature Tb is improved as compared with when such correction using the fuel correction coefficient Kf is not performed.

(6) To calculate the heating value Qburn, the lower heating value LC of fuel is calculated based on the alcohol concentration AD of the fuel. This allows the heating value Qburn to be calculated in consideration of the lower heating value that changes according to the alcohol concentration AD. Accordingly, the estimation accuracy of the cylinder bore temperature Tb is improved as compared with when calculation of the lower heating value based on the alcohol concentration AD is not performed.

(7) The temperature of the piston 5 correlates with the amount of heat received by the piston 5, the thermal resistance related to the temperature of the piston 5, and the temperature of coolant. In the present embodiment, the piston temperature Tp is calculated based on the piston heat receiving amount Qp, the first to fourth thermal resistances, and the coolant temperature Tw. This allows the temperature of the piston 5 to be calculated without estimating the combustion gas temperature, and thus improves the accuracy of estimating the piston temperature Tp. The improvement of the accuracy of estimating the piston temperature Tp improves the accuracy of determining whether the in-cylinder warm-up in the process of the S220 shown in FIG. 12.

(8) The first correction coefficient K1 is calculated for a decrease in the combustion gas temperature due to an ignition timing retardation to be reflected on the heating value Qburn. Thus, as compared with when the first correction coefficient K1 is not calculated, the accuracy of calculating the heating value Qburn is improved. The improvement of the accuracy of calculating the heating value Qburn improves the accuracy of estimating the piston temperature Tp is further improved.

(9) The second correction coefficient K2 is calculated for a decrease in the combustion gas temperature due to external EGR to be reflected on the heating value Qburn. Thus, as compared with when the second correction coefficient K2 is not calculated, the accuracy of calculating the heating value Qburn is improved. The improvement of the accuracy of calculating the heating value Qburn further improves the accuracy of estimating the piston temperature Tp.

(10) The third correction coefficient K3 is calculated for a decrease in the combustion gas temperature due to latent heat of evaporation of the fuel injected into the cylinders to be reflected on the heating value Qburn. Thus, as compared with when the third correction coefficient K3 is not calculated, the accuracy of calculating the heating value Qburn is improved. The improvement of the accuracy of calculating the heating value Qburn further improves the accuracy of estimating the piston temperature Tp.

Modifications

The above embodiment may be modified as follows. The above embodiment and the following modifications can be combined as long as the combined modifications remain technically consistent with each other.

As the reduction process, a process that changes the value of the increase coefficient Kq to 1 may be executed. In this case, when the third mode is selected, the increase correction amount of fuel becomes 0. Thus, the increase correction of the fuel at engine start is quickly suspended. This further improves the fuel economy.

As the speed decreasing process, the value of the idle-up coefficient Kup is set to 1 so as to suspend an increase in the idle rotation speed. Alternatively, the value of the attenuation coefficient Kgup by which the idle-up coefficient Kup is multiplied may be set to a given value Kgupd defined in advance. The given value Kgupd is set to a value smaller than the value of the attenuation coefficient Kgup set before the third mode is selected. Such a change in the attenuation coefficient Kgup decreases the value of the idle-up coefficient Kup decreases more quickly every time the idle-up coefficient Kup is updated. As the value of the idle-up coefficient Kup decreases more quickly, the speed of decrease in the increase amount of the idle rotation speed becomes higher. Thus, the engine rotation speed Ne at engine start decreases more quickly over time. As the engine rotation speed Ne decreases more quickly over time, the number of fuel injections per unit time decreases. Thus, in this modification, the fuel economy at engine start is improved in the same manner as the embodiment.

The speed decreasing process does not have to be executed. Even in this case, the advantages other than (2) are gained.

The cylinder bore temperature Tb and the piston temperature Tp may be calculated in other manners.

The cylinder bore temperature Tb, the piston temperature Tp, or the port wall temperature Tpo may be obtained through actual measurement. Alternatively, the cylinder bore temperature Tb, the piston temperature Tp, and the port wall temperature Tpo may be all obtained through actual measurement.

The procedure of each process shown in FIGS. 2 and 6 may be changed.

Each value obtained from the mapping data may be calculated using a functional expression.

The first correction coefficient K1 does not have to be calculated. Even in this case, the advantages other than (8) are gained.

The second correction coefficient K2 does not have to be calculated. Even in this case, the advantages other than (9) are gained.

The third correction coefficient K3 does not have to be calculated. Even in this case, the advantages other than (10) are gained.

The correction of the fuel injection amount Q using the fuel correction coefficient Kf may be omitted. Even in this case, the advantages other than (5) are gained.

The calculation of the lower heating value LC according to the alcohol concentration AD may be omitted. Even in this case, the advantages other than (6) are gained.

While the control circuitry of the controller 100 includes the CPU 110 and the memory 120 and executes software processing, this is merely exemplary. For example, the controller 100 may include a dedicated hardware circuit (such as an ASIC) that executes at least part of the software processes executed in the above embodiment. That is, the controller 100 may be modified as long as it has any one of the following configurations (a) to (c): (a) a configuration including a processor that executes all of the above-described processes according to programs and a program storage device such as a memory that stores the programs (including a non-transitory computer-readable memory medium); (b) a configuration including a processor and a program storage device that execute part of the above processes according to the programs and a dedicated hardware circuit that executes the remaining processes; and (c) a configuration including a dedicated hardware circuit that executes all of the above processes. A plurality of software circuits each including a processor and a program storage device and a plurality of dedicated hardware circuits may be provided. That is, the above processes may be executed in any manner as long as the processes are executed by processing circuitry that includes at least one of a set of one or more software circuits and a set of one or more dedicated hardware circuits. The program storage devices, or computer-readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine, the internal combustion engine including a port injection valve configured to inject fuel into an intake port of the internal combustion engine and a direct injection valve configured to directly inject the fuel into a cylinder of the internal combustion engine, the controller comprising:

control circuitry configured to, in response to the internal combustion engine being started, execute an increase correction control for the fuel, wherein the control circuitry is configured to:

obtain a first temperature of the intake port, a second temperature of a piston in the cylinder, and a third temperature of a wall surface of a cylinder bore, wherein the cylinder bore is defined by a cylinder inner wall of the cylinder;

determine whether warm-up in the intake port is completed based on the first temperature;

in response to determining that the warm-up in the intake port is not completed, execute a first mode, which executes, based on an engine rotation speed and an engine load factor of the internal combustion engine, (a) a dual injection mode or (b) a direct injection mode, wherein the dual injection mode injects the fuel from the direct injection valve and the port injection valve, and the direct injection mode injects the fuel only from the direct injection valve without injecting the fuel from the port injection valve;

in response to determining that the warm-up in the intake port is completed, execute a determination process that determines whether warm-up in the cylinder is completed based on the second temperature or the third temperature;

in response to determining that the warm-up in the cylinder is not completed, execute a second mode, which executes, based on the engine rotation speed and the engine load factor, (a) the dual injection mode, (b) the direct injection mode, or (c) a port injection mode, wherein the port injection mode injects the fuel only from the port injection valve without injecting the fuel from the direct injection valve; and in response to determining that the warm-up in the cylinder is completed, execute a third mode, which executes (i) the direct injection mode regardless of the engine rotation speed and the engine load factor; and (ii) a reduction process that sets a first increase correction amount of fuel to be less than a second increase correction amount of fuel, wherein the first increase correction amount of fuel is obtained through the increase correction control when executing the direct injection mode in the third mode, and the second increase correction amount is obtained prior to the execution of the direct injection mode in the third mode.

2. The controller for the internal combustion engine according to claim 1, wherein the determination process includes, in response to the second temperature being greater than or equal to a given determination value, determining that the warm-up in the cylinder is completed.

3. The controller for the internal combustion engine according to claim 1, wherein the determination process includes, in response to the third temperature being greater than or equal to a given determination value, determining that the warm-up in the cylinder is completed.

4. The controller for the internal combustion engine according to claim 1, wherein the control circuitry is further configured to, in response to the internal combustion engine being started, increase an idle rotation speed of the internal combustion engine, and the control circuitry is configured to execute a speed decreasing process that sets a first decreasing speed of an increase amount of the idle rotation speed when executing the direct injection mode in the third mode to be higher than a second decreasing speed obtained prior to the execution of the direct injection mode in the third mode.

5. The controller for the internal combustion engine according to claim 4, wherein the speed decreasing process suspends an increase in the idle rotation speed.

6. A control method for an internal combustion engine executed by control circuitry, the control method comprising:

injecting fuel into an intake port using a port injection valve of the internal combustion engine;

directly injecting the fuel into a cylinder of the internal combustion engine using a direct injection valve of the internal combustion engine;

in response to the internal combustion engine being started, executing an increase correction control for the fuel;

obtaining a first temperature of the intake port, a second temperature of a piston in the cylinder, and a third temperature of a wall surface of a cylinder bore, wherein the cylinder bore is defined by a cylinder inner wall of the cylinder;

determining whether warm-up in the intake port is completed based on the first temperature;

in response to determining that the warm-up in the intake port is not completed, executing a first mode, which executes, based on an engine rotation speed and an engine load factor of the internal combustion engine, (a) a dual injection mode or (b) a direct injection mode, wherein the dual injection mode injects the fuel from the direct injection valve and the port injection valve, and the direct injection mode injects the fuel only from the direct injection valve without injecting the fuel from the port injection valve;

in response to determining that warm-up in the intake port is completed, executing a determination process determining whether warm-up in the cylinder is completed based on the second temperature or the third temperature;

in response to determining that the warm-up in the cylinder is not completed, executing a second mode, which executes, based on the engine rotation speed and the engine load factor, (a) the dual injection mode, (b) the direct injection mode, or (c) a port injection mode, wherein the port injection mode injects the fuel only from the port injection valve without injecting the fuel from the direct injection valve; and in response to determining that the warm-up in the cylinder is completed, executing a third mode, which executes (i) the direct injection mode regardless of the engine rotation speed and the engine load factor; and (ii) a reduction process setting a first increase correction amount of fuel to be less than a second increase correction amount of fuel, wherein the first increase correction amount of fuel is obtained through the increase correction control when executing the direct injection mode in the third mode, and the second increase correction amount is obtained prior to the execution of the direct injection mode in the third mode.

7. A non-transitory computer-readable memory medium that stores a program for causing a processor to execute a control process for an internal combustion engine, the control process comprising:

injecting fuel into an intake port using a port injection valve of the internal combustion engine;

directly injecting the fuel into a cylinder of the internal combustion engine using a direct injection valve of the internal combustion engine;

in response to the internal combustion engine being started, executing an increase correction control for the fuel;

obtaining a first temperature of the intake port, a second temperature of a piston in the cylinder, and a third temperature of a wall surface of a cylinder bore, wherein the cylinder bore is defined by a cylinder inner wall of the cylinder;

determining whether warm-up in the intake port is completed based on the first temperature;

in response to determining that the warm-up in the intake port is not completed, executing a first mode, which executes, based on an engine rotation speed and an engine load factor of the internal combustion engine, (a) a dual injection mode or (b) a direct injection mode, wherein the dual injection mode injects the fuel from the direct injection valve and the port injection valve, and the direct injection mode injects the fuel only from the direct injection valve without injecting the fuel from the port injection valve;

in response to determining that warm-up in the intake port is completed, executing a determination process determining whether warm-up in the cylinder is completed based on the second temperature or the third temperature;

in response to determining that the warm-up in the cylinder is not completed, executing a second mode, which executes, based on the engine rotation speed and the engine load factor, (a) the dual injection mode, (b) the direct injection mode, or (c) a port injection mode, wherein the port injection mode injects the fuel only from the port injection valve without injecting the fuel from the direct injection valve; and in response to determining that the warm-up in the cylinder is completed, executing a third mode, which executes, (i) the direct injection mode regardless of the engine rotation speed and the engine load factor, and (ii) a reduction process setting a first increase correction amount of fuel to be less than a second increase correction amount of fuel, wherein the first increase correction amount of fuel is obtained through the increase correction control when executing the direct injection mode in the third mode, and the second increase correction amount is obtained prior to the execution of the direct injection mode in the third mode.

8. The controller for the internal combustion engine according to claim 2, wherein the determination process includes, in response to the third temperature being greater than or equal to a further given determination value, determining that the warm-up in the cylinder is completed.

9. The controller for the internal combustion engine according to claim 8, wherein the control circuitry is further configured to, in response to the internal combustion engine being started, increase an idle rotation speed of the internal combustion engine, and the third mode further executes a speed decreasing process that sets a first decreasing speed of an increase amount of the idle rotation speed when executing the direct injection mode in the third mode to be higher than a second decreasing speed obtained prior to the execution of the direct injection mode in the third mode.

10. The controller for the internal combustion engine according to claim 9, wherein the speed decreasing process suspends an increase in the idle rotation speed.

11. The control method according to claim 6, wherein the determination process includes in response to the second temperature being greater than or equal to a given determination value, determining that the warm-up in the cylinder is completed.

12. The control method according to claim 11, wherein the determination process includes in response to the third temperature being greater than or equal to a further given determination value, determining that the warm-up in the cylinder is completed.

13. The control method according to claim 12, further comprising:

in response to the internal combustion engine being started, increasing an idle rotation speed of the internal combustion engine, wherein the third mode further executes a speed decreasing process that sets a first decreasing speed of an increase amount of the idle rotation speed when executing the direct injection mode in the third mode to be higher than a second decreasing speed obtained prior to the execution of the direct injection mode in the third mode.

14. The control method according to claim 13, wherein the speed decreasing process suspends an increase in the idle rotation speed.

15. The non-transitory computer-readable memory medium according to claim 7, wherein the determination process includes in response to the second temperature being greater than or equal to a given determination value, determining that the warm-up in the cylinder is completed.

16. The non-transitory computer-readable memory medium according to claim 15, wherein the determination process includes in response to the third temperature being greater than or equal to a further given determination value, determining that the warm-up in the cylinder is completed.

17. The non-transitory computer-readable memory medium according to claim 16, the control process further comprising:

in response to the internal combustion engine being started, increasing an idle rotation speed of the internal combustion engine, wherein the third mode further executes a speed decreasing process that sets a first decreasing speed of an increase amount of the idle rotation speed when executing the direct injection mode in the third mode to be higher than a second decreasing speed obtained prior to the execution of the direct injection mode in the third mode.

18. The non-transitory computer-readable memory medium according to claim 17, wherein the speed decreasing process suspends an increase in the idle rotation speed.

* * * * *